US007049622B1

(12) United States Patent
Weiss

(10) Patent No.: US 7,049,622 B1
(45) Date of Patent: May 23, 2006

(54) OPTICAL POSITION SENSOR FOR DETERMINING THE INTERFACE BETWEEN A CLEAR AND AN OPAQUE FLUID

(75) Inventor: Jonathan D. Weiss, Albuquerque, NM (US)

(73) Assignee: Sandia Corporation, Albuquerque, NM (US)

( * ) Notice: Subject to any disclaimer, the term of this patent is extended or adjusted under 35 U.S.C. 154(b) by 0 days.

(21) Appl. No.: 11/019,841

(22) Filed: Dec. 21, 2004

Related U.S. Application Data

(60) Provisional application No. 60/561,028, filed on Apr. 9, 2004.

(51) Int. Cl.
*G01N 21/49* (2006.01)

(52) U.S. Cl. ............... 250/577; 250/573; 250/574; 250/900; 250/904; 340/619; 73/64.55; 73/290 R; 73/293

(58) Field of Classification Search ........ 250/573–577, 250/900, 904; 340/619, 686.1; 73/64.55, 73/293, 290 B, 290 R; 385/12, 141, 142
See application file for complete search history.

(56) References Cited

U.S. PATENT DOCUMENTS

| 4,275,965 | A | 6/1981 | Snitzer et al. |
|---|---|---|---|
| 4,403,826 | A | 9/1983 | Presby |
| 4,488,773 | A | 12/1984 | Wagner |
| 4,870,292 | A | 9/1989 | Alpert et al. |
| 4,942,306 | A | 7/1990 | Colbourne |
| 4,994,682 | A | 2/1991 | Woodside |
| 5,005,005 | A | 4/1991 | Brossia et al. |
| 5,072,617 | A | 12/1991 | Weiss |
| 5,187,545 | A | 2/1993 | Allgauer |
| H1364 | H | * 10/1994 | Toeppen ............... 372/6 |
| 5,387,791 | A | 2/1995 | Weiss |
| 5,419,636 | A | 5/1995 | Weiss |
| 5,422,495 | A | 6/1995 | Cohn |
| 5,585,915 | A | 12/1996 | Kurosawa et al. |
| 5,880,475 | A | 3/1999 | Oka et al. |
| 5,995,686 | A | 11/1999 | Hamburger et al. |
| 6,009,216 | A | 12/1999 | Pruett et al. |

(Continued)

OTHER PUBLICATIONS

Jonathan D. Weiss "Impurity-Doped Fiber-Optic Shock Position Sensor", Journal of Lightwave Technology, vol. 12, No. 10, Oct. 1994, pp. 1891-1896.

(Continued)

*Primary Examiner*—Stephone B. Allen
*Assistant Examiner*—Davienne Monbleau
(74) *Attorney, Agent, or Firm*—Robert D. Watson

(57) ABSTRACT

An inexpensive, optical position sensor for measuring a position or length, x, along a one-dimensional curvilinear, coordinate system. The sensor can be used, for example, to determine the position of an interface between a clear and an opaque fluid (such as crude oil and water). In one embodiment, the sensor utilizes the principle of dual-fluorescence, where a primary fiber emits primary fluorescent light and a parallel secondary fiber collects a portion of the primary fluorescent light that is not blocked by the opaque fluid. This, in turn, excites secondary fluorescence in the secondary fiber at a longer wavelength. A light detector measures the intensity of secondary fluorescence emitted from an end of the secondary fiber, which is used to calculate the unknown position or length, x. Side-emitting fibers can be used in place of, or in addition to, fluorescent fibers. The all-optical sensor is attractive for applications involving flammable liquids.

28 Claims, 17 Drawing Sheets

U.S. PATENT DOCUMENTS

| | | |
|---|---|---|
| 6,172,377 B1 | 1/2001 | Weiss |
| 6,356,675 B1 | 3/2002 | Weiss |
| 6,546,174 B1 | 4/2003 | Clarkin |
| 6,693,285 B1 | 2/2004 | Weiss |
| 6,831,290 B1 * | 12/2004 | Mentzer ............... 250/577 |

OTHER PUBLICATIONS

Jonathan D. Weiss, "Fluorescent Optical Liquid-Level Sensor", Society of Photo-Optical Instrumentation Engineers, Opt. Eng. 39(8), Aug. 2000, pp. 2198-2213.

* cited by examiner

Sec. A-A

Sec. B-B

OPTICAL POSITION SENSOR FOR DETERMINING THE INTERFACE BETWEEN A CLEAR AND AN OPAQUE FLUID

CROSS-REFERENCE TO RELATED APPLICATIONS

This application claims the benefit of U.S. Provisional Patent Application Ser. No. 60/561,028 filed Apr. 9, 2004, which is incorporated herein by reference.

FEDERALLY SPONSORED RESEARCH

The United States Government has rights in this invention pursuant to Department of Energy Contract No. DE-AC04-94AL85000 with Sandia Corporation.

BACKGROUND OF THE INVENTION

The present invention relates generally to optical position sensors for measuring the position of an object; or for detecting the interface between a clear and opaque liquid that are immiscible in each other, such as crude oil and water contained in a storage tank.

Water generally accompanies the production of crude oil. This bi-layered "liquid" is temporarily stored in tanks for eventual separation, with the oil going in one direction and the water in another. Knowing the position of the oil-water interface is important in preventing either the oil or the water from going where it should not during transfer to successive tanks.

The use of optical fibers or waveguides for fluid level sensors are attractive because they introduce no electrical energy into the storage container, are insensitive to electromagnetic interference, have no moving parts, can provide a continuous measurement of fluid level, and are generally low cost.

SUMMARY OF THE INVENTION

The present invention relates to a simple, inexpensive, optical position sensor for measuring a position or length, x, along a one-dimensional curvilinear, coordinate system. Some embodiments of the sensor can be used, for example, to determine the position of an interface between a clear and an opaque fluid (such as crude oil and water). In one embodiment, the sensor utilizes the principle of dual-fluorescence; where a primary fiber emits primary fluorescent light and an adjacent secondary fiber collects that portion of the primary fluorescent light that is not blocked by the opaque fluid. This, in turn, excites secondary fluorescence in the secondary fiber at a longer wavelength. A light detector measures the intensity of secondary fluorescence emitted from an end of the secondary fiber, which is used to determine the unknown position or length, x. Side-emitting fibers can be used in place of, or in addition to, fluorescent fibers. The optical sensor is attractive for applications involving flammable liquids.

BRIEF DESCRIPTION OF THE DRAWINGS

The accompanying drawings, which are incorporated in and form part of the specification, illustrate various examples of the present invention and, together with the detailed description, serve to explain the principles of the invention. In all of the drawings of this application, they are schematic drawings, they are not scaled, and they are not intended to represent any particular dimension or aspect ratios of dimensions.

DETAILED DESCRIPTION OF THE INVENTION

The terms "fiber" and "optical fiber" are used interchangeably with the terms "waveguide", "optical waveguide", and "light guide". The term "optical fiber" is defined herein to include any type of optical waveguide capable of guiding light along its length; including, but not limited to, circular optical fiber and non-circular optical waveguides. The term "waveguide" includes, among other things, rope-like geometries consisting of multiple strands of optical fibers interwoven like a rope. The term "side-emitting", "side-receiving", and "side-collecting" are used interchangeably herein.

Figure 1:
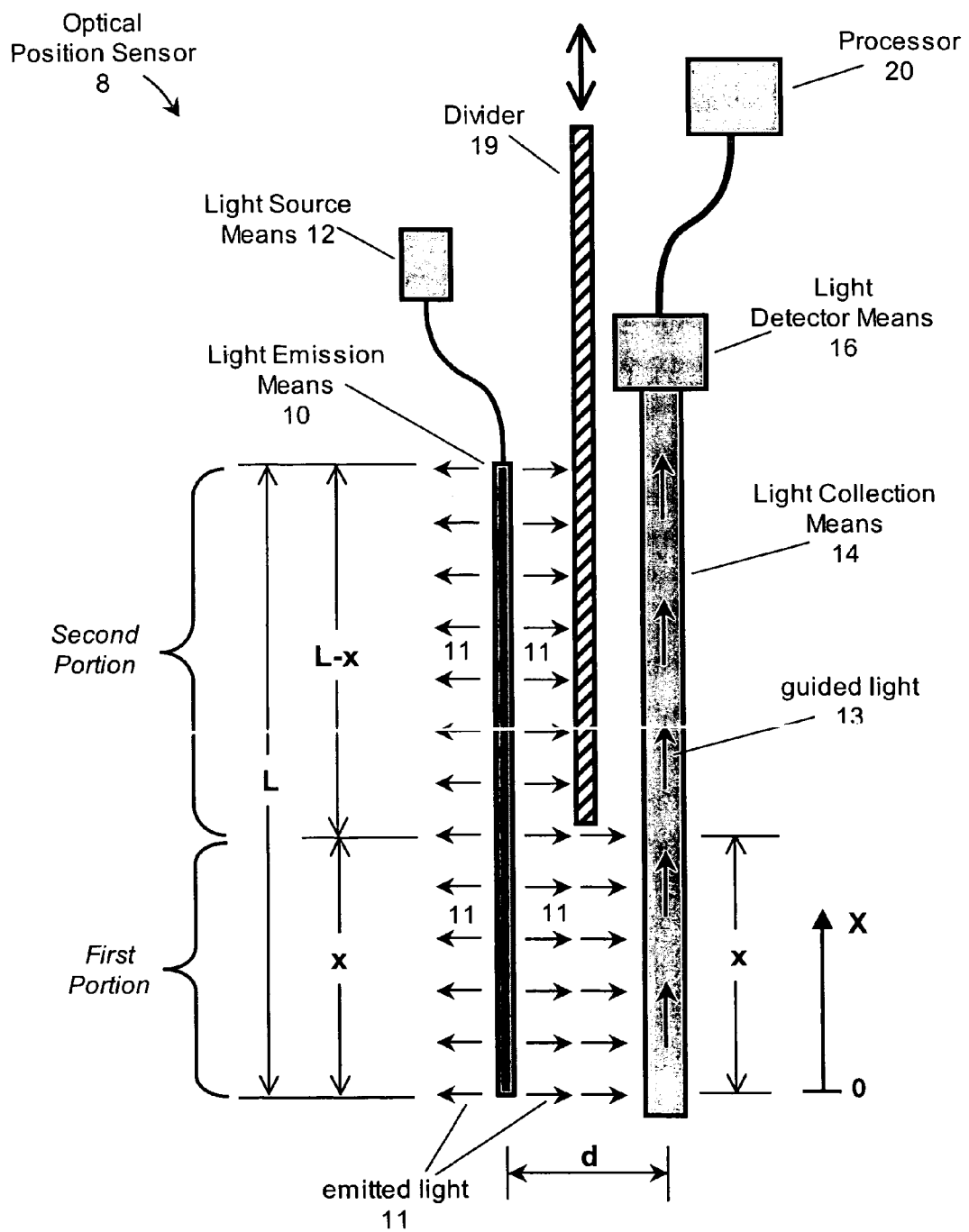
FIG. 1 shows a schematic side view of an embodiment of an optical position sensor for measuring a length, x, along a one-dimensional curvilinear, coordinate system, X.

FIG. 1 shows a schematic side view of an embodiment of an optical position sensor for measuring a length, x, along a one-dimensional curvilinear, coordinate system, X. Sensor 8 may comprise: first light source means 12 for causing light 11 to be emitted radially outwards from light emission means 10 along a length=L, wherein light emission means 10 has a first portion with a length=x, and has a second portion with a length=L−x; light collection means 14, oriented substantially parallel to light emission means 10, for collecting light 11 emitted from the first portion of light emission means 10; means 19 for preventing light 11, emitted from the second portion of light emission means 10, from being collected by light collection means 14; first light detector means 16, optically coupled to an upper end of light collection means 14, for detecting guided light 13 emitted from the upper end of light collection means 14, and for generating a signal proportional to the intensity of detected light, wherein the signal increases monotonically as the length, x, of the first portion of light emission means 10 increases. Optionally, sensor 8 may comprise processor means 20, operably connected to light detector 16 via a cable or wirelessly, for calculating the desired length measurement, x, by analyzing the signal outputted by light detector 16.

Optical position sensor 8 does not comprise means for internally reflecting light 11, emitted from the first portion of light emission means 10, off of a transparent liquid sensing surface (not shown), in a direction towards light collection means 14; when the transparent liquid sensing surface is wetted on its opposite side by a first liquid (not shown) having a first refractive index. Additionally, sensor 8 does not comprise means for refracting and transmitting light 11, emitted from the second portion of light emission means 10, through the transparent liquid sensing surface; when a second fluid (not shown), having a second refractive index that is greater than the first refractive index, is present on the wetted side of the transparent liquid sensing surface.

Light emission means 10 may comprise a primary fiber 10; and light collection means 14 may comprise a secondary optical fiber 14. Secondary fiber 14 may spaced apart from primary fiber 10 by a substantially constant distance, d; wherein d<<L (for example, d/L≦10).

The shape of light emission means 10 may be a straight line or a curved line (i.e., curvilinear, such as a circle or arc), or combinations of both straight and curved shapes. Light emission means 10 may comprise any of the following linear means for generating light along a straight or curved line, including: an optical fiber doped with one or more fluorescing dopants; a side-emitting fiber; a side-emitting fiber doped with one or more fluorescing dopants; a hot filament (e.g. halogen light bulb); a fluorescent light bulb; a quartz lamp; a string of LED's distributed along its length; a monolithic linear LED; light-emitting phosphors or gases (e.g., neon, argon, krypton, tungsten vapors, sodium vapors, mercury vapors), sunlight (or any other light source) passing through a mask or collimator with a linear (straight or curved) slit, aperture, or opening; or combinations thereof. Light source means 12 may comprise an electrical power supply (which may be battery-powered) for energizing light emission means 10 (e.g., when a hot filament is used), a LED source, a laser source, a source of broadband light that may (or may not) be filtered, a source of monochromatic incoherent light (e.g., tungsten, mercury, or sodium vapor lamp), ultraviolet and microwave sources, and a rastered beam of electrons (for exciting phosphors) or laser light. Light source means 12 may be optically coupled to light emission means 10 via a clear (i.e., non-fluorescent) optical fiber. Likewise, light detector means 16 may be optically coupled to the upper end of light collection means 16 via a clear (i.e., non-fluorescent) optical fiber.

Light collection means 14 may comprise: an optical fiber doped with one or more fluorescing dopants, a side-emitting fiber, a side-emitting fiber doped with one or more fluorescing dopants, or combinations thereof. Light detector means 16 may comprise, for example, a photodetector or CCD array. Light detector 16 can be optimally chosen to closely match the spectrum of guided light 13 that is emitted by light collection means 14.

The magnitude of the signal output by light detector 16 increases monotonically with increasing intensity of light 13 emitted from the end of light collection means 14 optically coupled to light detector 16. Processor 20 may be a dedicated microprocessor, or a general-purpose computer, and may calculate the desired length (or position) measurement, x, by using a look-up table, a calibration curve, or by solving equations, as appropriate.

Means 19 for preventing light emitted from the second portion of light emission means 10 from being collected by light collection means 14, may comprise an opaque divider 19, which may comprise a sheet, baffle, shield, mask, separator, blade, shade, shutter, partition, tube, or cylinder, or combinations thereof, which is positioned in such a way as to block or shield the second portion of light 11 from illuminating (either directly, or indirectly, or both) light collection means 14.

The phrase "length measurement, x" means at least two things: (1) the length, x, of the first portion of light emission means 10 (e.g., the segment marked as "x" in FIG. 1); and (2) the position of a point along a one-dimensional, curvilinear coordinate system (e.g., the X-coordinate system in FIG. 1), relative to a reference point (e.g., x=0). In FIG. 1, for example the point having a coordinate position=x corresponds to the bottom edge of divider 19. The one-dimensional coordinate system (i.e., X-axis) may be straight, or curvilinear. If curvilinear, then the length or position measurement, x, refers to the path length along the path of the curved line. For example, the path may comprise a circular arc, measured in a cylindrical coordinate system (r, θ), where the length, x, equals the path length along the circumferential length, $2\pi r\theta/360$, of the circular arc, where the angle, θ, is measured in degrees.

Light emission means 10 and light collector means 14 may substantially overlap each other along the length=L. The length of light collector means 14 may be equal to or greater than L. In the embodiment shown in FIG. 1, light emission means 10 and light collection means 14 may be constrained to move as a single object along the X-axis, meaning that their relative positions with respect to each other (along the X-axis) are not allowed to change. Divider 19 is movable, along the X-axis, relative to the constrained pair of light emission means 10 and light collection means 14.

Position sensor 8 may, or may not, be immersed in a transparent medium, such as a vacuum, air, a transparent liquid, or a transparent gas. The transparent medium should be transparent in, at least, the wavelength spectrum of emitted light 11.

In the time domain, light emission means 10 may be operated in a variety of modes, including: continuously (i.e., steady-state); pulsed; repeatedly pulsed, or continuously modulated (e.g., sinusoidally, at a fixed (but adjustable) frequency); or combinations thereof.

Processor 20 may comprise means for performing Optical Time Domain Reflectometry (OTDR) using sensor 8, which will be discussed later.

The axial distribution (i.e., along the X-direction) of light 11 emitted by light emission means 10 may be substantially constant along its length, as illustrated in FIG. 1; or, it may have a non-uniform distribution along its length, e.g., such as a linear gradient, decaying exponential, or other shape. The intensity of the pump light (i.e., pump power) would be expected to diminish along the length of optical fiber 10, due to internal absorption by the fiber itself, and due to conversion of the pump light into emitted light 11 (e.g., by fluorescence, or by side emission, or both). The decrease in emitted light 11 along the length, L, due to a diminishing pump power, may be negligible. However, if the decrease is significant, then the properties of fiber 10 may change along its length in such as way as to compensate for the reduction in pump power, e.g., by increasing the concentration of fluorescent dopant along the length of fiber 10 in such a way that there is progressively more conversion of pump light to fluorescent light, per unit length, to compensate for the decrease in pump light intensity along the fiber's length.

At any given axial position along the length of light emission means 10, the circumferential variation in the emitted light 11 may be substantially constant (see, for example, FIG. 4); or it may be non-uniform (e.g., strongly peaked on the side of light emission means 10 facing the light collection means 14). See, for example, FIG. 5. Such a strongly peaked circumferential distribution can be achieved, for example, by using side-emitting fibers that have been specially treated (e.g., notched, scratched) on only one side to emit light preferentially within a narrow range of angles (e.g., in a 5–45 degree arc).

Light 11 emitted by light emission means 10 may comprise single or multiple wavelengths; it may be coherent or incoherent; and it may have a spectrum that lies, for example, in the visible, infrared, near-infrared, far-infrared, ultraviolet, near-ultraviolet, or far-ultraviolet spectrum, or combinations thereof. Light emission and collection means 10, 14, respectively, may comprise any material (e.g., plastic or glass) capable of internally guiding light along its length. They may, for example, have a cross-sectional shape of a square, circle, or rectangle.

The amount of light detected by light detector 16 In FIG. 1 increases in a monotonic, continuous way as divider 19 moves upwards, because less light 11 from the second portion of primary fiber 10 is blocked from reaching secondary fiber 14; and, hence, more light 11 from the first portion of primary fiber 10 reaches secondary fiber means 14.

The space (i.e., volume) located in-between primary fiber 10 and secondary fiber 14, along the second portion having a length=L−x, may be filled with an opaque fluid (not shown); wherein the spacing, d, is sufficiently large so as to substantially block light 11 emitted from the second portion of primary fiber 10 from illuminating secondary fiber 14. The phrase "substantially block" can mean, among other things, that less than about 5% of the light 11 emitted by the second portion of primary fiber 10 illuminates secondary fiber 14.

Referring still to FIG. 1, an example of a method of measuring a length, x, along a one-dimensional curvilinear, coordinate system, X, using optical position sensor 8; may comprise the following steps:

a) providing a primary optical fiber 10 with a length=L, a first portion having a length=x, and a second portion having a length=L−x;
b) providing a secondary optical fiber 14, oriented substantially parallel to the primary fiber, and spaced apart by a substantially constant distance, d, wherein d<<L;
c) providing means 19 for preventing light, emitted from the second portion of the primary fiber 10, from being collected by the secondary fiber 14;
d) providing a first light detector 16 that is optically coupled to an upper end of the secondary fiber 14;
e) emitting light 11 from the first and second portions of the primary fiber 10;
f) collecting light 11, emitted from the first portion, with the secondary fiber 14;
g) trapping and guiding some of the collected light 13 inside of the secondary fiber 14;
h) preventing light 11, emitted from the second portion, from being collected by the secondary fiber 14;
i) detecting, with the first light detector 16, guided light 13 that is emitted from the upper end of the secondary fiber 14; and
j) calculating the desired length measurement, x, by analyzing a signal, outputted by the first light detector 16 that increases monotonically as the length, x, of the first portion of the primary fiber 10 increases;
wherein the method does not comprise internally reflecting light 11, emitted from the first portion, off of a first side of a transparent liquid sensing surface (not shown), in a direction towards the first light detector 16, when the transparent liquid sensing surface is wetted on its opposite side by a first liquid (not shown) having a first refractive index; and
wherein the method does not comprise refracting and transmitting light 11, emitted from the second portion, through the transparent liquid sensing surface, when a second fluid (not shown), having a second refractive index that is greater than the first refractive index, is present on the wetted side of the transparent liquid sensing surface.

Figure 2A:
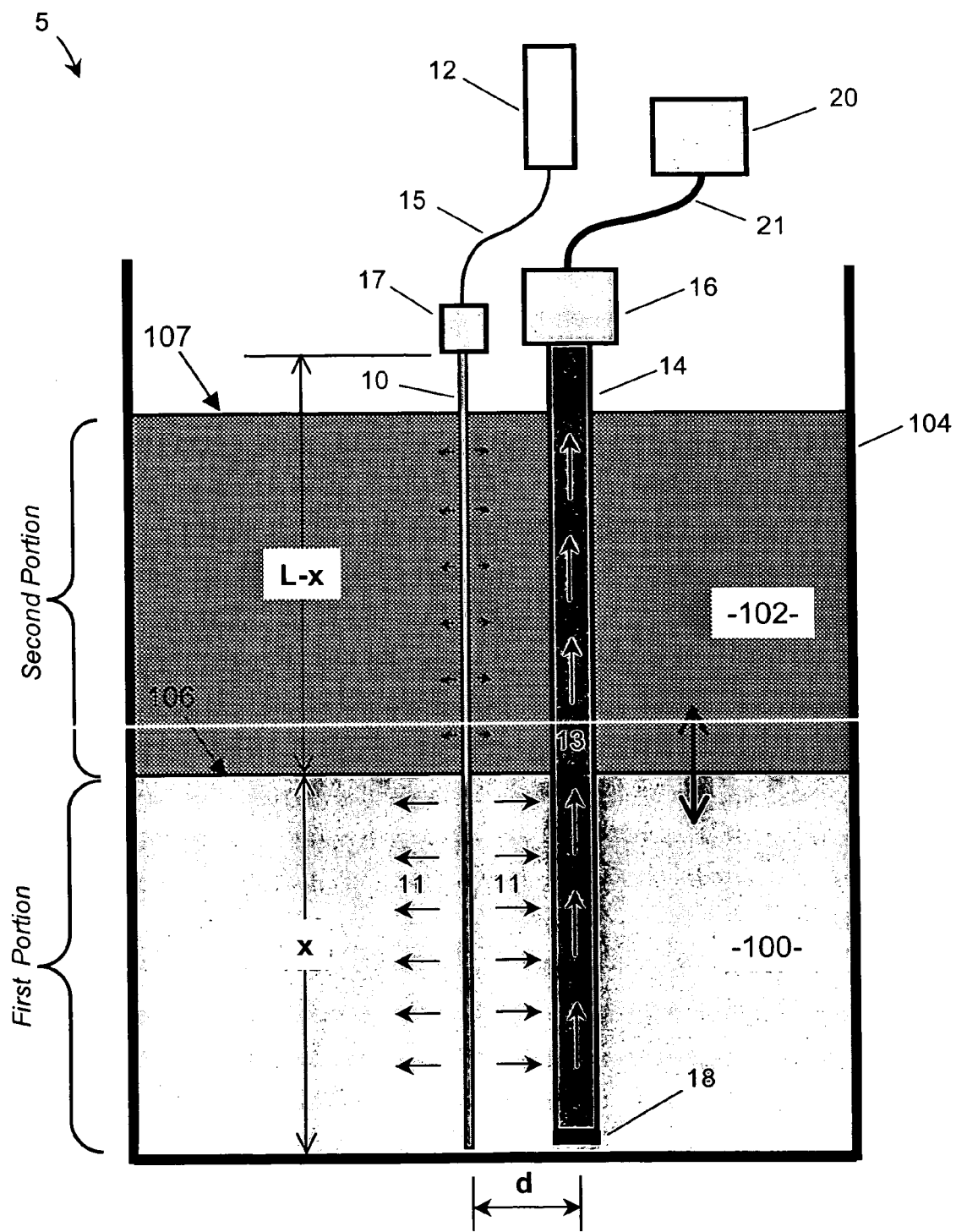
FIG. 2A shows a schematic side view of an example of an application for measuring the height of the interface between two immiscible fluids contained in a tank.

FIG. 2A shows a schematic side view of an example of an application for measuring the height of the interface between two immiscible fluids contained in a tank, according to present invention. Tank 104 contains a heavier, clear liquid 100 (e.g., water) on the bottom; and a lighter, opaque liquid 102 (e.g., crude oil) floating on top of the clear liquid 100. The boundary in-between the lower clear liquid 100 and the upper opaque liquid 102 is labeled as interface 106. Likewise, the boundary in-between upper opaque liquid 102 and the air above is labeled interface 107. The position of interface 106 is located at a vertical distance, x, from the bottom end of light emission means 10. Light emission means 10 can be placed near to, or resting on, the bottom of tank 104. Optical fiber 10 is positioned vertically inside of tank 104. A LED or laser source 12 is attached supplies light to primary fiber 10 via optical fiber 15 and optical coupler 17. Light collection means 14 is oriented substantially parallel to light emission means 10, and is spaced apart from line light emission means 10 at a substantially constant distance, d. Light detector 16 is optically coupled to the upper end of light collection means 14, and measures the intensity of guided light 13 emitted by light collection means 14. Alternatively, light detector 16 may be located remotely away from tank 104 (to reduce the chance of an explosion or fire), by using a clear optical fiber coupled to the upper end of light collection means 14. A reflective mirror 18 may be attached to the bottom ends of light collection means 14 and/or line light emission means 10 to reflect light backwards to prevent light from being lost out those ends.

Signal processor 20 may be operably connected to detector 16 via cable 21 (or via a wireless connection), and converts the signal output by detector 16 (e.g., a photodiode) into the desired height measurement, x, of the oil/water interface 106 by using a look-up table, a calibration curve, or by solving equations, etc. Structural supporting elements (not shown) support and hold primary fiber 10 and the light collection means 14 at a fixed distance d apart. Light emission means 10, light collection means 14, and light detector 16 are removably attached to tank 104. The structural supports should allow fluids 100 and 102 to flow into the space/volume located in-between light emission means 10 and light collection means 14; and the supports should not significantly interfere with the operation of the optical sensor.

When pumped by LED or laser source 12, optical fiber 10 emits light 11 radially outwards. The axial distribution of emitted light 11 may be substantially constant along its length. A first portion of light 11, which is emitted along the length=x, passes substantially through clear liquid 100 and illuminates a lower portion of light collection means 14. However, a second portion of light 11 (which is emitted along the length=L−x) is substantially blocked by opaque liquid 102 and prevented from illuminating light collection means 14. The light 11 that illuminates light collection means 14 is received, absorbed, or collected by light collection means 14. The light 11 that is received, absorbed, or collected by light collection means 14 then generates (or creates or produces) an internal source of light 13; some of which is emitted radially outwards and lost from light collection means 14; with the remaining being absorbed or guided inside of light collection means 14. Some of this guided light 13 may be reflected from the bottom end by a mirror 18 (e.g., mirrored end of light collection means 14); and some exits from the upper end of light collection means 14, which illuminates detector 16 (e.g., a photocell or CCD array). The signal output by detector 16 is sent to processor 20 via cable 21. Processor 20 analyzes the detector signal, and calculates the desired height, x, of the oil/water interface 106.

The magnitude of the signal outputted by light detector 16 depends in a monotonic and continuous fashion on the intensity of guided light 13, which, in turn, depends in a similar fashion on the total amount of light 11 that illuminates light collection means 14 and is not blocked by opaque liquid 102. As the height of the oil/water interface 106 increases, more and more of the light 11 emitted by the first portion of light emission means 10 passes through clear liquid 100 and is received by light collection means 14, thereby increasing the detector's signal. Conversely, as the height, x, of the oil/water interface 106 decreases, more and more of the light 11 emitted by light emission means 10 will be absorbed and blocked by opaque liquid 102, causing less and less of the light that passes through clear liquid 100 to illuminate light collection means 14, thereby decreasing the detector's signal. Note that in both of these examples, we assume that the height of the fluid/air interface 107 (i.e., the top of the opaque liquid 102) remains constant with respect to tank 104.

Referring still to the example application in FIG. 2A, it is possible to have a reversed situation (not illustrated), i.e., where the opaque liquid 102 is heavier, and the clear liquid 100 is lighter (while still being immiscible in each other). In this case, the output signal from detector 16 will decrease with increasing height, x, of the interface 106, as more and more of the light 11 from light emission means 10 is blocked by the opaque fluid 102 lying on the bottom of tank 104.

The spacing, d, between light emission means 10 and light collection means 14 should be large enough so that opaque fluid 102 can successfully block a significant amount (e.g., more than 90–95%) of the light 11 emitted by light emission means 10. If the spacing, d, is too small, however, than some of the light 11 may be transmitted through the opaque fluid, which would add an additional, confounding signal and distort the results. Additionally, the spacing, d, should not too large, because the clear fluid 100 (which may not be perfectly clear) should not absorb too much (e.g., not more than 5–10%) of the light 11 emitted by light emission means 10, in order to keep the output signal of detector 16 sufficiently high to be useful. For crude oil, a spacing, d, of about 0.2–0.3 inches should be adequate to provide a significant amount of blocking.

The definition of "opaque" is not restricted just to blocking light within the visible spectrum; it also means that wavelengths outside of the visible spectrum may be blocked. Water, for example, absorbs light everywhere outside the visible spectrum. Thus, if the wavelength of light 11 emitted by light emission means 10 were in the infrared spectrum, then water would act as an opaque liquid, and any air lying above the water could act as a clear "liquid". By recognizing that light may be blocked (or transmitted) at wavelengths outside of the visible spectrum, the optical position sensor can be used with a broader range of liquids, such as two liquids that are immiscible, but both are visibly clear.

The definition of "liquid" or "fluid" in this application is broadly defined to include, among other things, composite or mixed media, such as water mixed with suspended particles (e.g., river water with suspended silt or algae), or a gas with suspended particles.

Even if the opaque fluid doesn't block more than, for example, 95% of the light over a fixed distance "d"; and/or even if the clear fluid absorbs more than, for example, 5% of the light over the same distance "d", then the various embodiments of the optical position sensor will still be able to measure the position of, for example, an interface between two fluids, if the differential transmission between the two liquids is large enough. However, the change in the detector's output signal as the interface position moves up or down (i.e., the sensitivity) may become too small to be useful, given unavoidable errors in the system, if too much parasitic absorbtion occurs in the clear fluid, and/or too much unwanted transmission through the opaque fluid.

In a broader sense, the presence of the opaque liquid 102 disposed in-between light emission means 10 and light collection means 14 in FIG. 2A provides, in effect, the same function that opaque divider 19 does in FIG. 1, i.e., to prevent light 11 from the second portion of light emission means 10 from reaching light collection means 14.

The principle of "dual-fluorescence" may be used in various embodiments of optical position sensors according to the present invention. Simply stated, a pump source excites "primary" fluorescence at a first peak wavelength in an optical fiber containing a first dopant. These dopants cause the fibers to fluoresce when exposed to light having the "correct" wavelength or range of wavelengths (i.e., a wavelength(s) selected to lie within the band of wavelengths that excites fluorescence). Examples of fluorescing dopants include organic dyes (over 80 different organic dyes are commercially available, having fluorescent emission ranging from 370 nm to 820 nm) for use with plastic fibers; and rare-earth elements for use with glass fibers, such as neodymium or erbium, which fluoresce at about 1060 nm, in response to pumping at about 810 nm.

Figure 2B:
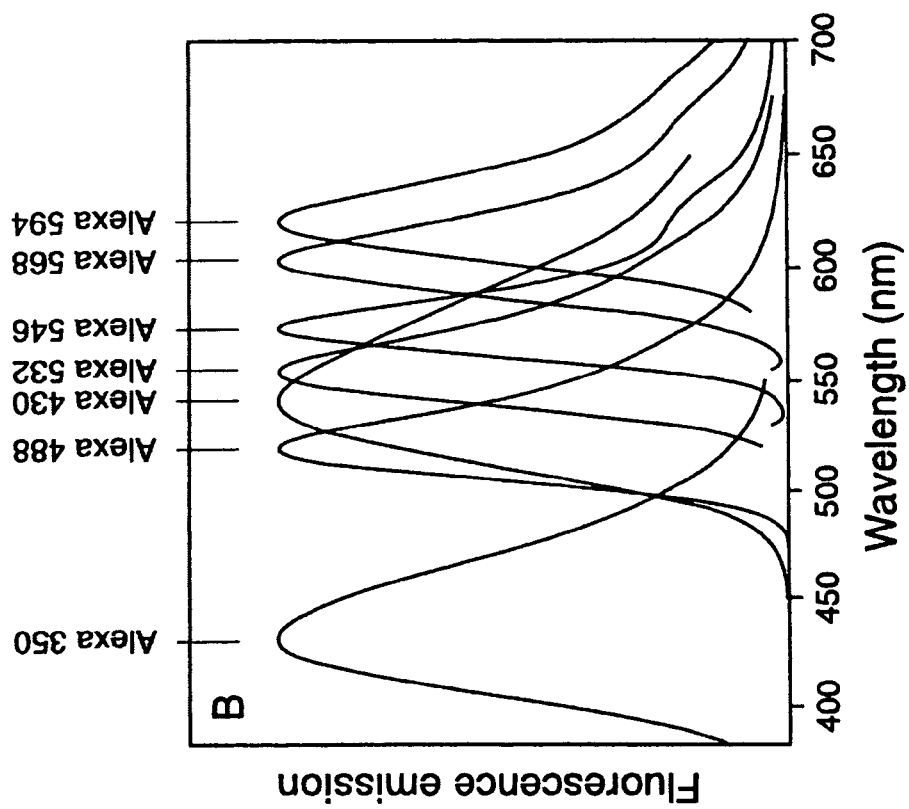
FIG. 2B shows example absorptance spectra and fluorescence emission spectra, as a function of wavelength, for a family of related organic fluorescent dyes manufactured by Molecular Probes, Inc.
Figure 2B:
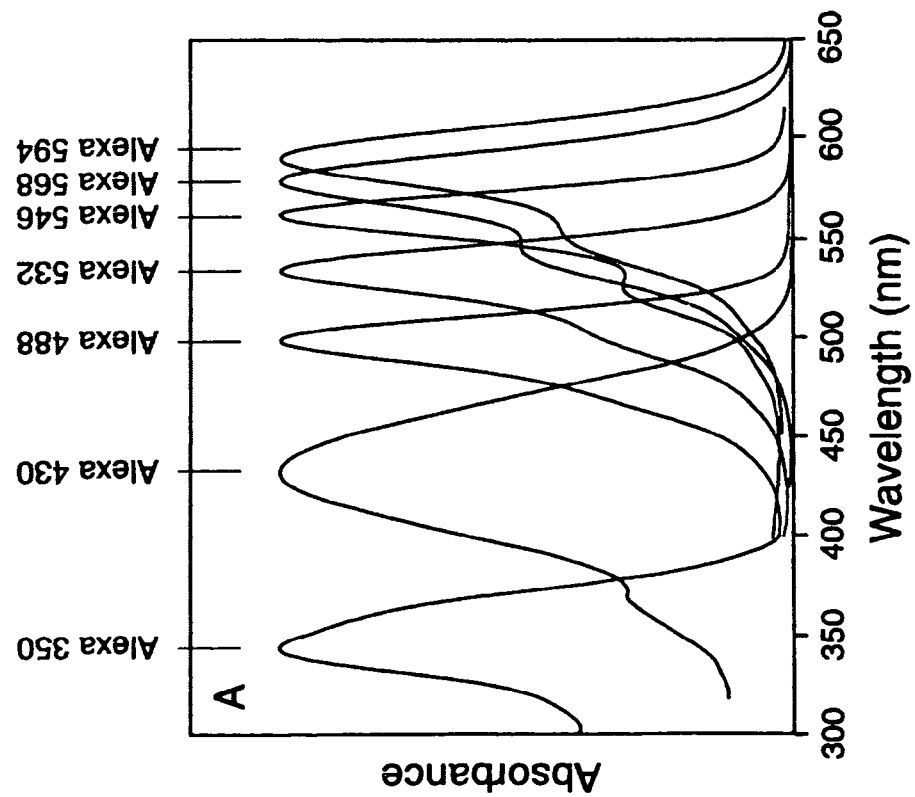

FIG. 2B shows example absorptance spectra and fluorescence emission spectra, as a function of wavelength, for a family of related organic fluorescent dyes manufactured by Molecular Probes, Inc. A good pair of organic dyes that could be used in "dual-fluorescence" embodiments of the present invention include "Alexa 350" for the primary dopant, and "Alexa 430" for the secondary dopant. The primary dopant, Alexa 350, has a peak absorptance at 346 nm (violet) and a peak emission at 442 nm (blue). The secondary dopant, Alexa 430, has a peak absorptance at 434 nm and a peak emission at 541 nm (yellow). So, this pair of organic dyes comprises a good example where the primary dopant emits fluorescent light at a peak emission wavelength (442 nm), which is very close to the peak absorptance wavelength (434) of the secondary dopant, so that good coupling occurs between the primary and secondary fibers. In fact, FIG. 2B shows that the entire emission spectrum of the first dopant (Alexa 350) almost exactly overlays and matches the entire absorptance spectrum of the second dopant (Alexa 430).

FIG. 2B shows that the absorptance and emission spectra of the first dopant, Alexa 350, have very little overlap with each other. Likewise, the absorptance and emission spectra for the second dopant, Alexa 430, have little overlap with each other. Non-overlap between the absorption and emission spectra of a given dopant prevents self-absorption of the fluorescence radiation. Self-absorption refers to fluorescent light emitted by a given dopant stimulating more fluorescent light by the other, similar, dopants. If this were to happen in the secondary fiber 14, some of the secondary fluorescence that was originally guided would become unguided. The result would be a reduction in signal. This occurs because fluorescent light is stimulated to emit isotropically; thus, some of it escapes the fiber. One could argue that some of the original fluorescence that was unguided would, through self-absorption, become guided. Self-absorption might be an advantage if it occurs in the primary fiber 10 because it causes more of the primary fluorescence to leave this fiber and impinge upon the secondary fiber 14.

The principle of "dual-fluorescence", stated another way, means that the primary fiber comprises a first dopant that emits primary fluorescent light at a first (peak) wavelength, when pumped by excitation light; and, the secondary fiber comprises a second dopant that emits secondary fluorescence light at a second (peak) wavelength, in response to being illuminated by primary fluorescent light emitted from the primary fiber at the first (peak) wavelength.

The word "dopant" is defined to comprise one of more chemicals that can fluoresce when excited at the correct "wavelength" (i.e., correct band of wavelengths). For the sake of simplicity and brevity, I refer herein to fluorescent light as being emitted at a certain "wavelength" (e.g., green, or, "a first peak wavelength"); when, in fact, the fluorescent light is actually emitted within a known spectral band of wavelengths that has a peak emission at a specific wavelength. So, when I refer to the phrase, e.g., "fluorescence being emitted at a first peak wavelength", this is equivalent to saying "fluorescence being emitted within a known spectral band of wavelengths that has a peak emission at a first peak wavelength".

Applying the principle of dual-fluorescence to various embodiments of the present invention, light emission means 10 may comprise an optical fiber doped with a first dopant, and light collection means 14 may comprise a different optical fiber doped with a second dopant. Referring to FIG. 2A, pump source 12 may comprise a source of excitation light (e.g., a laser, LED, or a filtered broadband light source). During operation, excitation light emitted by pump source 12 (e.g., blue) excites/pumps the first dopant in light emission means 10 to emit primary fluorescence 11 at a first peak wavelength (e.g., green). Some of the excited primary fluorescent light 11 that reaches light collection means 14 is absorbed, or, trapped and guided inside of light collection means 14, while the remaining light 11 is radiated isotropically away (unless peaked, side-emitting features are used) from light emission means 10 in a radial direction.

Next, some of the primary fluorescent light 11 that is emitted radially from light emission means 10 passes through clear liquid 100 and illuminates light collection means 14. Some of this illumination light is collected (i.e., absorbed, received) by light collection means 14, which is doped with a second dopant having the property that it can be excited by the primary fluorescent light 11 to emit secondary fluorescence 13 at a different wavelength (typically, longer) than the primary fluorescence 11. For example, the primary fluorescent light 11 (green) that is absorbed by light collection means 14 excites secondary fluorescence 13 (red) inside of light collection means 14. Only that segment of light collection means 14 that is immersed in clear fluid 100 will be illuminated by primary fluorescent light 11. The primary fluorescent light 11 absorbed in light collection means 14 generates secondary fluorescence 13 at a longer wavelength. The corresponding section of light collection means 14 that is immersed in the opaque fluid 102 will not be exited to generate secondary fluorescence because opaque fluid 102 substantially blocks most, if not all, of the primary fluorescent light 11 emitted radially from light emission means 10 into opaque fluid 102.

The secondary fluorescent light 13 generated inside of light collection means 14 is emitted essentially isotropically from the bulk. Some of the secondary fluorescence will be lost by radiation in the radial direction. However, the remaining secondary fluorescence is absorbed, or trapped and internally guided inside light collection means 14. The secondary fluorescence that is guided inside light collection means 14 is designated "guided light 13" in this embodiment. A mirror 18 or reflective surface may be placed at the bottom end of light collection means 14 to prevent guided light 13 from being lost. Light detector 16 detects guided light 13 that is emitted from the upper end of light collection means 14.

In other embodiments of my optical position sensor, "side-emitting" optical fiber(s) or waveguide(s) may be used in place of, or in addition to, fluorescent fibers. Side-emitting fibers (or waveguides) can scatter light, from inside the fiber, outwards in a radial direction (i.e., perpendicular to the fiber's surface). A number of different types of side-emitting fibers are presently commercially available. Various methods are used to cause side-emission, e.g., scratching the surface, or cutting or scoring a large number of small notches or grooves on the fiber's surface. Also, multiple fibers may be woven into a rope-like configuration, which utilizes micro bending of the woven fibers to refract guided light radially outwards. Alternatively, internal defects or scattering sites may be introduced inside of the fiber's core or cladding (or both). The same principles of scattering can be applied to optical waveguides, as well as fibers, in the present invention. The region of the fiber where "side-emission" can occur may comprise the entire fiber, or it may be limited to only a portion of the fiber, e.g., a segment of the axial length, or a portion of the circumference of the fiber, or both.

Side-emitting fibers can also be utilized in the reverse mode, i.e., as a "side-adsorbing", "side-receiving", or "side-collecting" fiber; wherein light impinging on the side(s) from the outside is absorbed/collected/received and then internally guided within the fiber.

In another embodiment, the structure and operation of sensor 5 in FIG. 2A remains the same as described above, except that side-emitting fibers are used in place of fluorescent fibers. Light source 12 comprises a LED, laser, or broadband light source. Excitation light from source 12 is conveyed via un-doped, clear fiber 15 to the upper end of line light emission means 10 via coupler 17. The excitation light travels along side-emitting fiber 10, with some of it scatters outwards as light 11. Opaque liquid 102 blocks the light 11 from the upper portion of light emission means 10 from reaching light collection means 14, while light 11 emitted from the lower portion of light emission means 10 passes through clear liquid 100 to reach light collection means 14, which is a side-receiving waveguide. The light that is collected by side-receiving light collection means 14 is then guided along light collection means 14 to photodetector 16.

As discussed earlier, the intensity of the pump light (i.e., pump power) would be expected to diminish along the length of side-emitting fiber 10, due to internal absorption by the fiber itself, and due to scattering of the pump light radially outwards to create emitted light 11 (e.g., by fluorescence, or by side emission, or both). The decrease in emitted light 11 along the length, L, due to a diminishing pump power may be negligible. However, if the decrease is significant, then the properties of the side-emitting fiber 10 may change along its length in such as way as to compensate for the reduction in pump power, e.g., by increasing the density of scattering centers (i.e., scattering defects, notches, scratches, etc.) along the length of fiber 10 in such a way that there is progressively more scattering of pump light radially outwards, per unit length, to compensate for the decrease in pump light intensity along the fiber's length.

In another embodiment, side-emitting fibers may be doped with fluorescing dopants in a variety of different permutations. The way in which the optical position sensors work, however, remains essentially the same as before. For example, light emission means 10 could be a fluorescent fiber, while light collection means 14 could be a side-emitting fiber. Conversely, line light emission means 10 could be a side-emitting fiber, while light collection means 14 could be a fluorescent fiber. Alternatively, either fiber 10 or 14, or both, can be a side-emitting fiber that is also doped with one or more fluorescent dopants. In this latter case, detector 16 could comprise a pair of detectors that are selectively responsive to the different wavelengths of light guided by light collection means 14 (i.e., the light from source 12 that is sent into fiber 10, and the different wavelengths of fluorescent light that are excited within the various fibers).

Note that in FIG. 2, small segments of the upper ends of light emission means 10 and light collection means 14 can extend into the air above the interface 107 between liquid 102 and air. Light 11 emitted from exposed segment of fiber 10 may unintentionally illuminate the exposed segment of light collection means 14. This could cause an additional signal to be detected by light detector 16, which is unrelated to the position of the oil/water interface 106. However, this can be easily corrected for by subtracting out this unwanted signal, or by masking the exposed small pieces of light emission means 10 or light collection means 14 (or both) with opaque tape, an opaque sleeve, etc.

When the principle of "dual-fluorescence" is used in various embodiments of the present invention, the wavelengths of light that pumps/excites fluorescence in the source and detector fibers are naturally limited by the specific absorption and emission spectra of the specific fluorescent dopants that are used. In contrast, however, the use of side-emitting/side-receiving fibers allows a much greater range of wavelengths to be used, since the features that scatter light are independent (for the most part) on wavelength.

Referring still to FIG. 2A, a method and apparatus called Optical Time Domain Reflectometry (OTDR) may be used in combination with dual-fluorescent fibers. Here, light supply 12 sends a very short pulse of light into light emission means 10. Then, primary fluorescence in the primary fiber 10 would occur sequentially in time as the pulse traveled down the fiber. Likewise, secondary fluorescence would occur sequentially and travel up the detector fiber 14. Hence, the return signal detected by light detector 16 will be detected at a different wavelength, and at a delayed time, which can be measured. The strength of the return signal will depend on the local transmission, as well as other factors. These other factors could be determined using a very clear liquid. As in conventional OTDR, spatial resolution is obtained from the time of flight of the return signal, and the speed of light in the fiber(s).

Alternatively, the method and apparatus for OTDR may be used in conjunction with side-emitting fibers as well, or, with a combination of fluorescent and side-emitting fibers. For clarification, one might also say that the time of the first return, in the case where an opaque liquid is on top, tells where the interface is, since there is no transmission across the liquid above that point. This technique could also be used to detect the presence of an emulsion comprising a mixture of oil and water that may exist at the transition between oil and water. The OTDR technique could be used, within the limits of its spatial resolution, to measure the thickness of the emulsion layer. The signal starts out at zero, as before, but somewhat gradually increases to its value through the clear liquid.

Referring still to FIG. 2A, the transmission of light 11 through the side of light collection means 14 may be decreased by the presence of a thin biological film (e.g., algae growth), or other type of fouling. In this case, a second light detector (not shown) may be coupled to the bottom end of light collection means 14, in place of mirror 18. The signals outputted by both light detectors (i.e., at the top and bottom of light collection means 14), will depend in the same manner on the degree of fouling. However, the ratio of these two signals should be independent of the degree of fouling. Also, the ratio of the two signals will depend on position due to attenuation of the secondary fluorescent light 13 as it travels along the fiber. As an alternative to detecting the signal at the bottom end of detector fiber 14, a reference signal can be measured for purposes of calibrating the system by, for example, draining the tank 104 completely, or by filling the tank 104 with a single, clear fluid (or, by placing divider 19 at a known position, or removed completely, in FIG. 1).

An alternative method, based on "self-monitoring", can be used for detecting internal changes in sensor 5 (e.g., by fouling of surfaces, or aging of the various components, etc.). The basic idea is to monitor signals from the primary and secondary fluorescent fibers 10 and 14, respectively, that are unaffected by the position of the interface 106 (referring to the example shown in FIG. 2A; the concept applies to other embodiments as well). The relevant signal from the primary fluorescent fiber 10 is the primary fluorescence radiation that is guided by this fiber back toward the pump source 12. The cladding on this fiber causes this signal to be unaffected by the surrounding medium. Other things, however, affect it like connectors, bends in the fiber, and the strength of the pump source. Thus, if this signal is directed to a second light detector (not shown) optically coupled to primary fiber 10 (for example, at the end opposite from the light input; or at the same end as the light input when used with a splitter), then the entire primary line can be self-monitored. The light inputted to primary fiber 10 (or the power in supply 12 that drives light emission means 10), can be modulated at frequency $F_1$, which could be zero. Similarly, if one added a second pump source (not shown) to the secondary line 14, an analogous signal could be monitored from it. This second pump source (which, for example, be optically coupled to the end opposite from the light detector 16; or at the same end as the light input when used with a splitter), could be modulated at different frequency $F_2$ to electronically separate or filter the two fluorescence signals that would be present in detector fiber 14. The first signal is caused by the fluorescent light 11 emitted the primary fiber 10 (at $F_1$), and the second signal is caused by the second pump source (at $F_2$).

Another "confounder" could be the deterioration of initially clear surfaces caused by organic or inorganic material in the oil-water mixture. These surfaces could be those of the fibers themselves or any clear housing containing them. Any additional absorption resulting from a coating or a chemical reaction would reduce the optical power reaching the secondary fiber 14 from the primary fiber 10. A way of monitoring this effect would be to place a second, secondary fiber (not shown) close enough to the primary fiber 10 that the opaque liquid 102 is almost completely transmissive. (e.g., even crude oil is not perfectly opaque.) Thus, the signal in this case would be determined by the condition of the surfaces. For greatest consistency, this signal would be read when the desired signal is zero. This means that the oil-water interface would be at or below the bottom of the sensor.

Referring still to FIG. 2A, if just the crude oil (opaque fluid 102) is being pumped out of tank 104 to another tank (not shown) for processing, then the interface 106 between the oil and water will stay at a constant height and the signal from sensor 5 will not change. However, as the top of the oil level (interface 107) drops below the top of the sensor 5, then air, not crude oil, will fill the sensor above a certain point. Thus, the signal outputted by light detector 16 will start to increase again at the moment this happens. Given the previously known position of the interface 106, and the height of the sensor, one can then tell how much oil is left. By calibrating the change in signal vs. the height of the clear fluid (in this case, air) on top, one can continue to determine the diminishing amount of oil left if pumping continues.

Figure 2C:
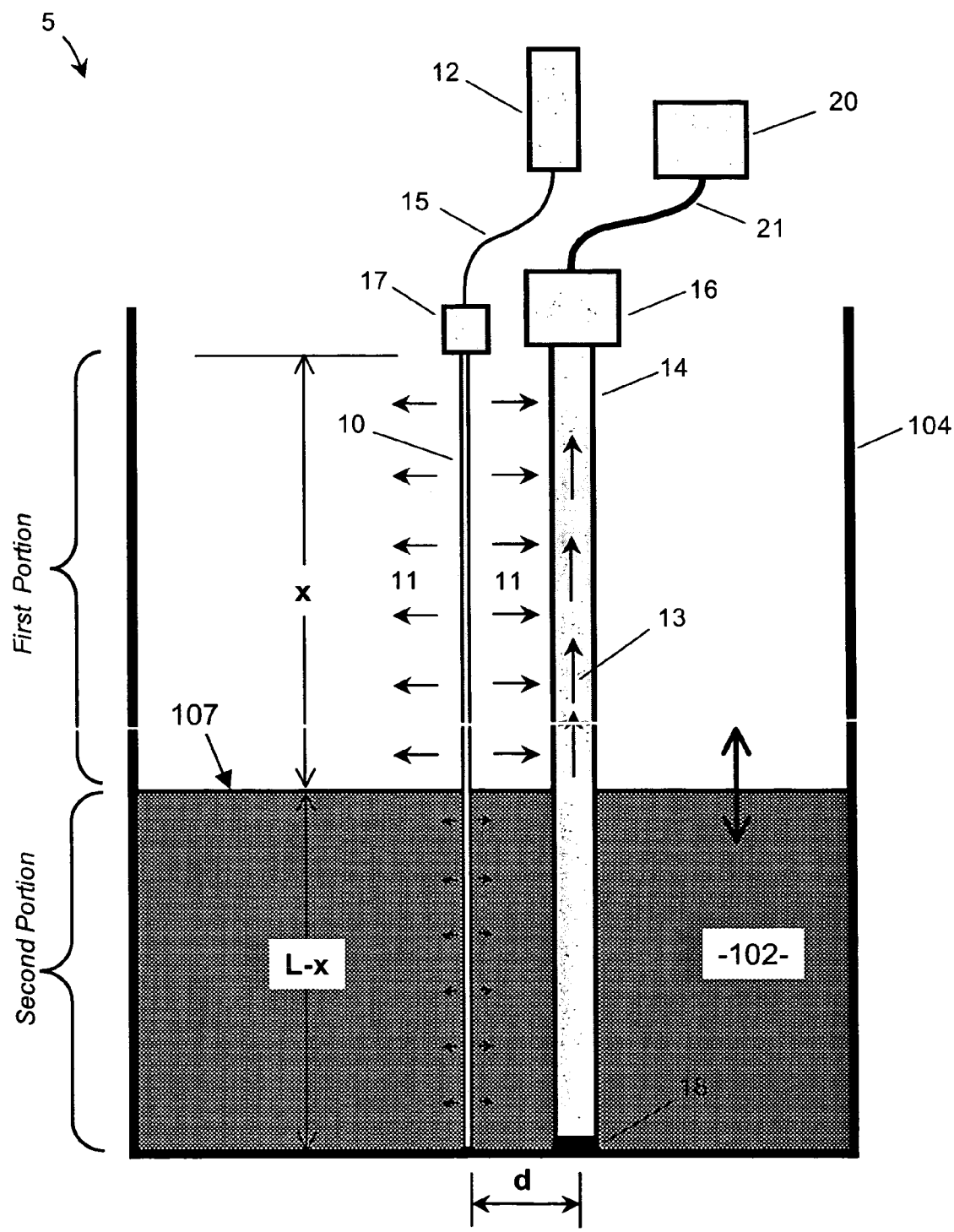
FIG. 2C shows a schematic side view of an example of an application for measuring the height of a single, opaque fluid contained in a tank.

FIG. 2C shows a schematic side view of an example of an application for measuring the height of a single, opaque fluid contained in a tank. Opaque fluid 102 rests at the bottom of tank 104, with air (or other transparent gas or fluid, which is immiscible with opaque fluid 102, and is lighter than opaque fluid 102) lying above. The position of the air/fluid interface 107 above the bottom of the tank equals the vertical height, L−x, of the second portion of sensor 5. The first portion of sensor 5, having a length, x, is surrounded by air. Sensor 5 is mounted rigidly (not shown) to tank 104, and the amount of fluid 102 is variable. The other components of sensor 5, and the general method of operation, remain the same as described in FIG. 2A. During operation, light 11 that is emitted from the first portion of primary fiber 10, having a length, x, passes through the transparent air, where it is collected by secondary fiber 14. On the other hand, light 11 that is emitted from the second portion of primary fiber 10, having a length, L−x, is blocked by opaque fluid 102 and prevented from reaching secondary fiber 14.

Figure 3A:
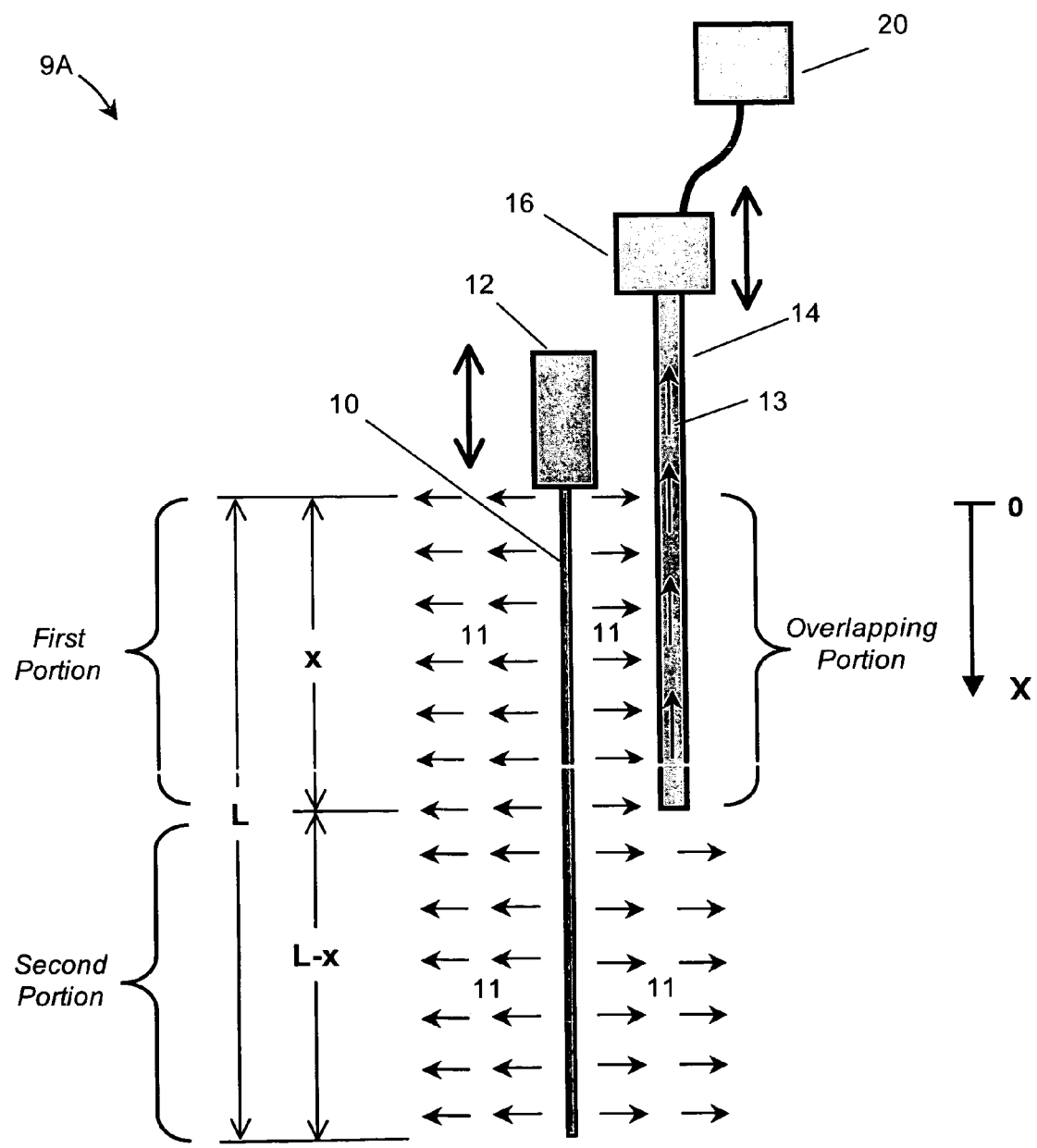
FIG. 3A shows a schematic side view of another example of an optical position sensor.

FIG. 3A shows a schematic side view of another example of an optical position sensor. Optical sensor 9A comprises: a light emission means 10 having a length=L; a light collection means 14 oriented substantially parallel to light emission means 10 and spaced apart from light emission means 10 by a substantially constant distance, d, wherein d<<L; means for generating light 13, which is internally guided within light collection means 14, in response to being illuminated by a first portion of light 11 having a length=x; a light detector 16 optically coupled to an end of light collection means 14, which outputs a signal whose magnitude increases monotonically with increasing intensity of guided light 13; and processor means 20, operably connected to light detector 16, for converting the signal outputted from detector 16 into the desired length (or position) measurement, x, by, for example, using a look-up table, a calibration curve, or by solving equations; wherein the light collection means 14 overlaps the first portion of light emission means 10 by a length=x, where x≦L, and wherein the origin of the X-axis coordinate system is located at the upper end of primary fiber 10. The segment of light 11 that is emitted from the first portion, having a length=x, is able to illuminate light collection means 14 because there is nothing placed in-between them to block the transmission light. However, the remaining segment of light 11 that is emitted from the second portion, having a length=L−x, radiates freely into space and is lost, because there is no overlap between light emission means 10 and waveguide detector 14 along the length, L−x, of the second portion.

Figure 3B:
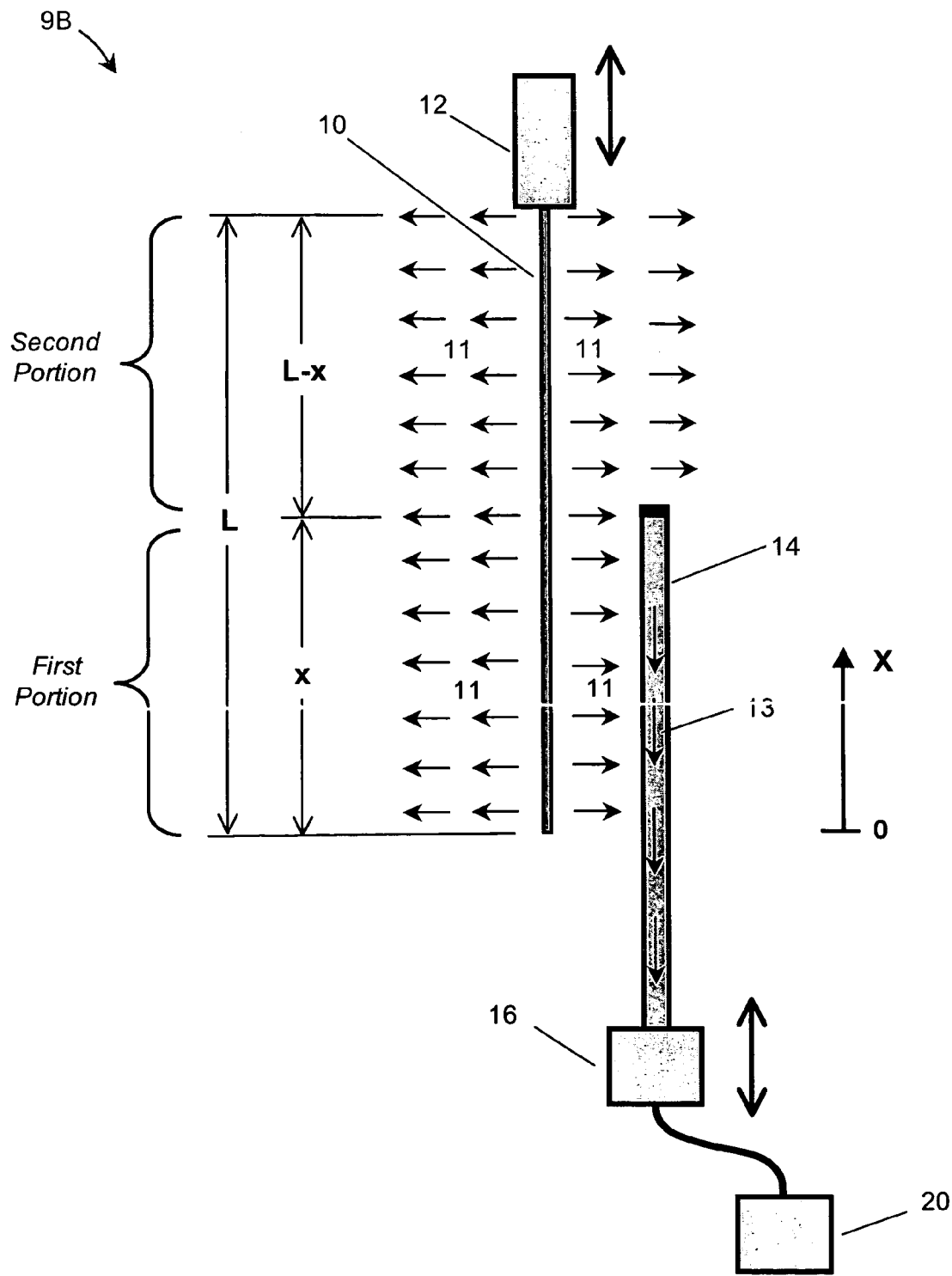
FIG. 3B shows a schematic side view of another example of an optical position sensor.

FIG. 3B shows a schematic side view of another example of an optical position sensor. Optical sensor 9B is essentially the same as sensor 9A shown in FIG. 3A, except that the origin of the X-axis coordinate system is at the lower end of primary fiber 10.

In FIGS. 3A and 3B, the relative positions of light emission means 10 and light collection means 14 are allowed to change with respect to each other along the "X-direction", while still being constrained to being spaced apart a substantially fixed distance, d. For example, light emission means 10 can be fixed in space, while light collection means 14 can move up and down along the X-axis (e.g., by being attached to a machine part that moves). Alternatively, light emission means 10 can move up and down along the X-axis (e.g., by being attached to a machine part that moves), while light collection means 14 remains fixed in space. Finally, both light emission means 10 and light collection means 14 can move in space relative to a fixed X-axis coordinate system. The amount of overlap equals the unknown distance, x, in all cases.

Sensor 9A and 9B can be used in applications that don't require two different fluids (i.e., one opaque and one transparent). Instead, sensors 9A and 9B may be located in a single, substantially transparent, liquid or gas medium, e.g., air, a gas, water, a vacuum, etc. Sliding supports (not shown) can be used to permit relative sliding motion along the X-axis, while confining light emission means 10 and detector fiber 14 to remain at the fixed spacing, d.

Figure 4:
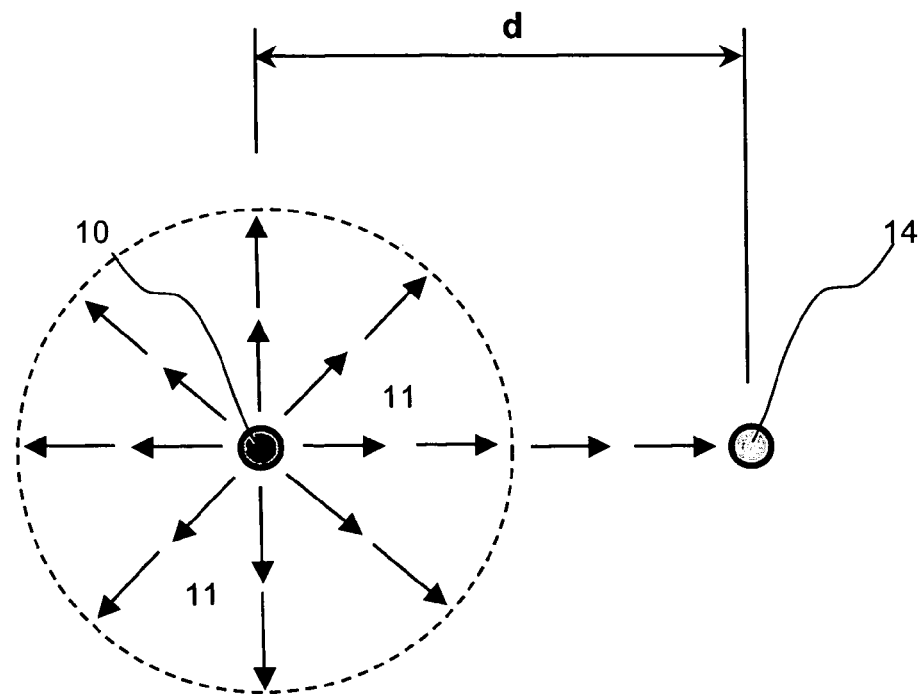
FIG. 4 illustrates a bird's eye, cross-section view of an example of an arrangement of a light source fiber and detector fiber.

FIG. 4 illustrates a bird's eye, cross-section view of an example of an arrangement of a light source fiber and detector fiber. Light emission means 10 emits light 11 radially outwards, with a uniform distribution around the circumference. This arrangement has lower light collection efficiency because only a small fraction of light 11 directly intersects and illuminates light collection means 14. However, the light collection efficiency of light collection means 14 can be improved in a number of simple ways.

Figure 5:
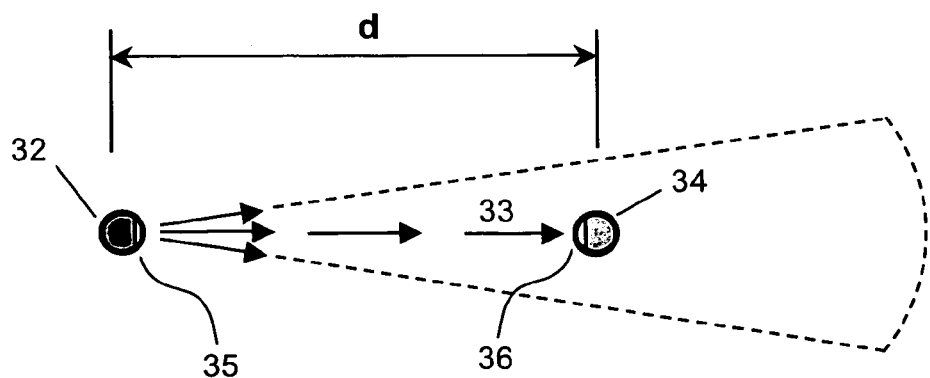
FIG. 5 illustrates a bird's eye, cross-section view of another example of an arrangement of a light source fiber and detector fiber.

FIG. 5 illustrates a bird's eye, cross-section view of another example of an arrangement of a light source fiber and detector fiber. Light source 32 is a side-emitting light source fiber 32 that has been selectively treated, for example, with notches or scratches 35, only on one side, i.e., the side facing detector fiber 34. Light 33 is emitted from source 32 only within a narrow range of circumferential angles, e.g., 10–30 degrees. Hence, a much larger proportion of the light 33 emitted by line source 32 is aimed directly towards detector fiber 34, which increases the collection efficiency. Additionally, detector fiber 34 may be treated in a similar fashion (i.e., notches, scratches 36) on only the side facing line source 32, in order to increase the amount of light collected/received by detector fiber 34, and to reduce (or prevent) the collected/received light from being parasitically lost out the backside of fiber 34 (which would happen if fiber 34 was uniformly side-emitting all around its circumference).

Figure 6:
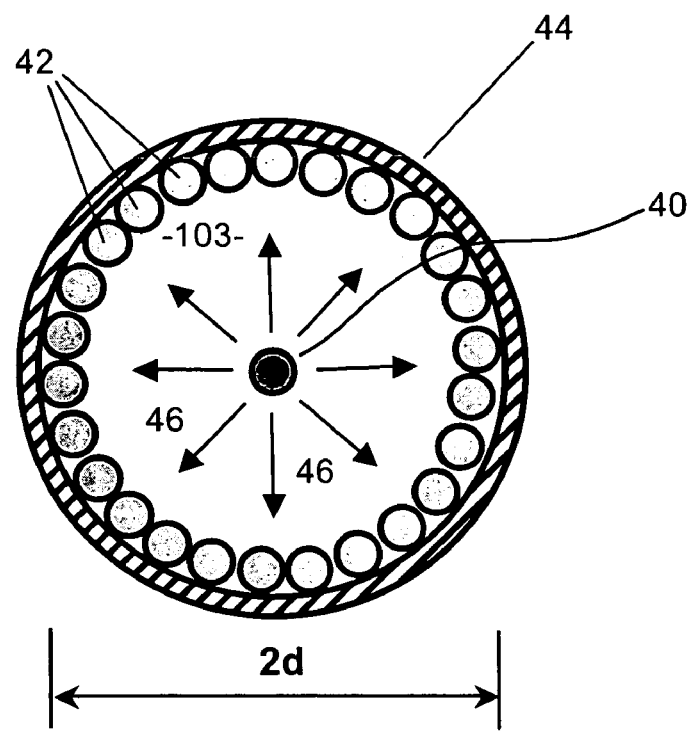
FIG. 6 illustrates a bird's eye, cross-section view of another example of an arrangement of a light source fiber and detector fiber.

FIG. 6 illustrates a bird's eye, cross-section view of another example of an arrangement of a light source fiber and detector fiber. Here, all of the fibers are contained inside of tube 44 having a diameter equal to 2d, and which may or may not have a reflective inner surface. Light source fiber 40 is disposed at the center of tube 44, and a circular ring (annulus) of detector fibers 42 are arranged side-by-side on the interior surface of tube 44. Light source fiber 40 emits lights 46 circumferentially uniformly towards the annular ring of detector fibers 42. Any light 46 which is not absorbed by a particular fiber 42 on the first pass may be reflected from that fiber and then absorbed by a different fiber 42 on a second pass, and so on. Tube 44 can be filled with a clear liquid or opaque liquid, or with both. Using this geometry, the collection efficiency for detector fibers 42 is much higher because source fiber 40 is completely surrounded 360 degrees by the bundle of collection fibers 42. This arrangement can be used with side-emitting fibers, fluorescent fibers, or a combination of both types of fibers, or with fibers that have both side-emitting and fluorescent properties. At the upper end (not shown) of tube 44, all of the detector fibers 42 can be bundled together and optically coupled to a single photodetector (not shown). Alternatively, a simple lens (such as a Fresnel lens) may be used outside of tube 44 to image and focus the ring of light emitted from the collective ends of the ring of fibers 42 into a much smaller, concentrated ring that focuses on the image plane of a photodetector sensor. Structural supports (not shown) are used to keep primary fiber 10 located at the central axis of tube 44.

Figure 7:
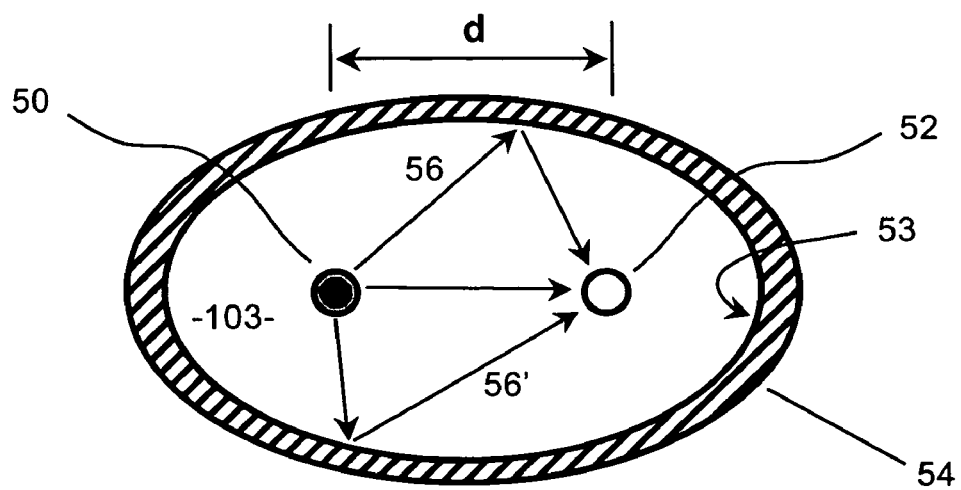
FIG. 7 illustrates a bird's eye, cross-section view of another example of an arrangement of a light source fiber and detector fiber.

FIG. 7 illustrates a bird's eye, cross-section view of another example of an arrangement of a light source fiber and detector fiber. Here, light source fiber 50 and detector fiber 52 are disposed inside of an elliptically-shaped tube 54 having a reflective inner surface 53. Fibers 50 and 52 are held in place (by supports not shown) at each of the two foci of the ellipse, respectively. The distance between the two fibers 50, 52 is equal to the spacing "d". In this geometry, the rays of light 56 which are emitted from source fiber 50 reflect off of inner surface 53 in a direction which advantageously hits detector fiber 52, no matter which direction light rays 56 are emitted, because of the geometrical properties of the ellipse). Any combination of side-emitting and/or fluorescent fibers may be used.

Figure 8:
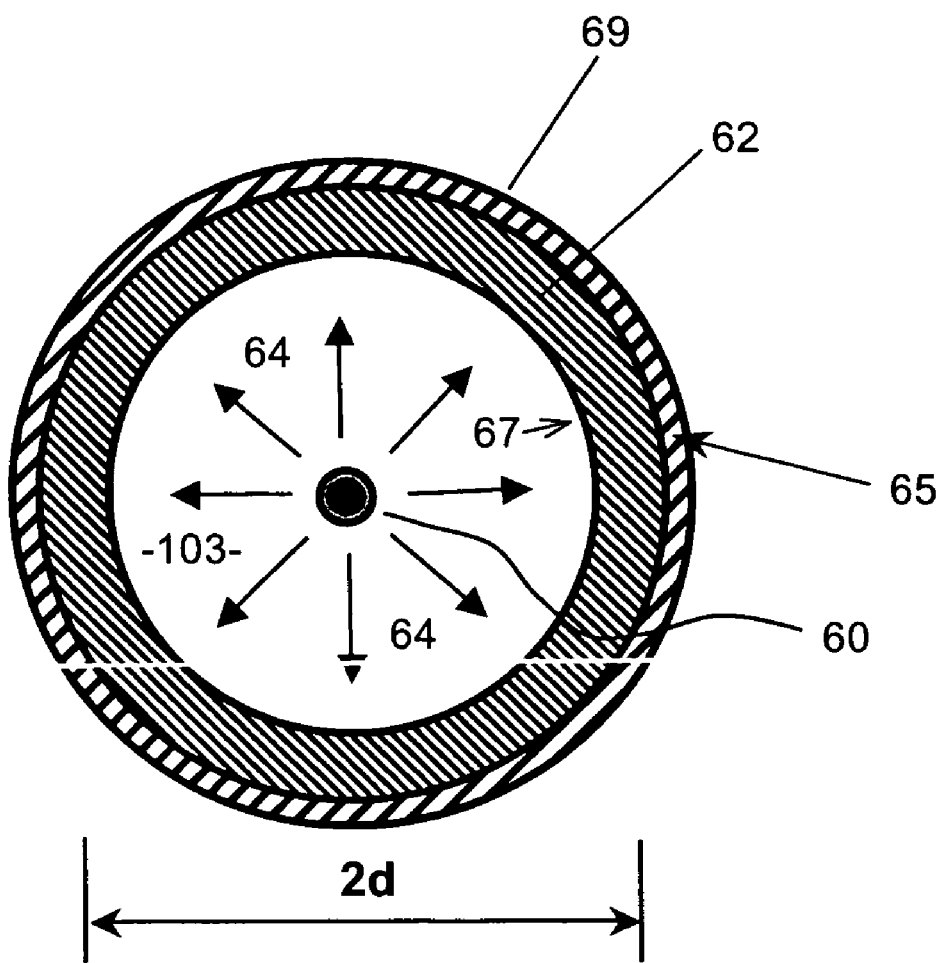
FIG. 8 illustrates a bird's eye, cross-section view of another example of an arrangement of a light source fiber and detector fiber.

FIG. 8 illustrates a bird's eye, cross-section view of another example of an arrangement of a light source fiber and detector fiber. This arrangement is similar to that shown in FIG. 6, except that the annular ring of detector fibers 42 from FIG. 6 has been replaced with a monolithic, thin-walled, tubular waveguide 62, which may or may not be disposed within a structural tube 69. Line source 60 and/or detector waveguide 62 may comprise fluorescing dopants, or may comprise side-emitting features, or may use combinations of both. Detector waveguide 62 may have side-emitting features located only on its interior surface 67, but not on the outer surface 65. Alternatively, the outer surface 65 of tube 62 may comprise a mirrored, reflective surface designed to reflect light back into tube 62 to generate multiple passes. Structural tube 69 may have a reflective inner surface to reflect light inwards. Alternatively, tube 62 may have a sufficiently thick wall (not illustrated) so as to absorb essentially all of the light 64 emitted by source fiber 60, thereby reducing the need to rely on a mirrored outer surface 65 to generate multiple passes and/or to rely on an outer structural tube 69.

Figure 9A:
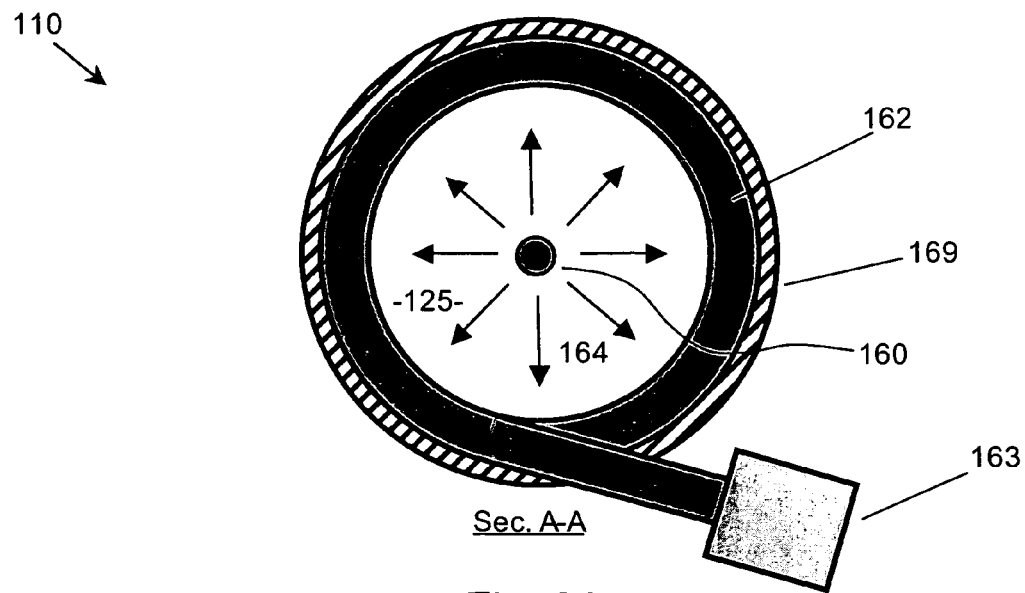
FIG. 9A shows a schematic bird's eye cross-section view of another example of an optical position sensor.
Figure 9B:
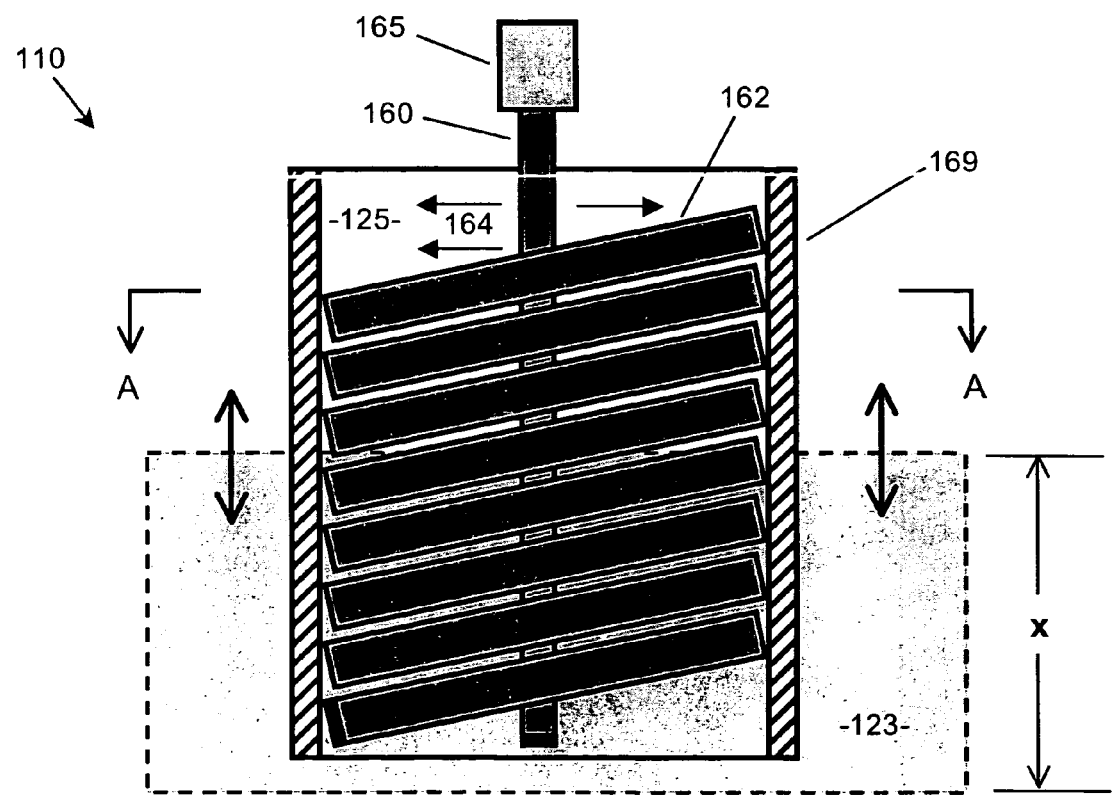
FIG. 9B shows a schematic elevation cross-section view of another example of an optical position sensor.

FIGS. 9A and 9B show a schematic bird's eye and elevation cross-section view, respectively, of another example of an optical position sensor. This embodiment is similar to that shown in FIG. 6, except that the annular ring of detector fibers 42 in FIG. 6 has been replaced with a single detector fiber 162 that has been wrapped into the shape of a helical or spiral coil. A thin-walled structural tube 169 surrounds and supports the coiled detector fiber 162. Structural tube 169 may have a reflective inner surface, and may have an open bottom to allow opaque liquid 123 to flow freely inside of sensor 110. Light source fiber 160, which is driven/energized by light supply 165, is disposed along the central axis of coiled detector fiber 162. In this example of an application, the lower portion of sensor 110 is depicted as being immersed in an opaque fluid 123, and the upper fluid 125 being air or a transparent, immiscible liquid. Light 164 is emitted circumferentially uniformly from source fiber 160 in a radial direction. Light 164 passes substantially through transparent fluid 125 (e.g., air), and then is received by coiled detector fiber 162. However, in the lower half of sensor 110, light 164 is substantially blocked by opaque fluid 123. The height, x, of the liquid/air interface is determined by a processor (not shown) from the output signal of light detector 163, in the same manner as described before. Light source fiber 160 and/or coiled detector fiber 162 may comprise fluorescing dopants, or side-emitting features, or they may each use combinations of dopants and side-emitting features. Both fibers may have a mirrored end to reflect light backwards up the fiber. Coiled detector fiber 162 may have a circular, square, or rectangular cross-sectional shape. A square shape allows for a closer packing of each turn of the coil.

Figure 10:
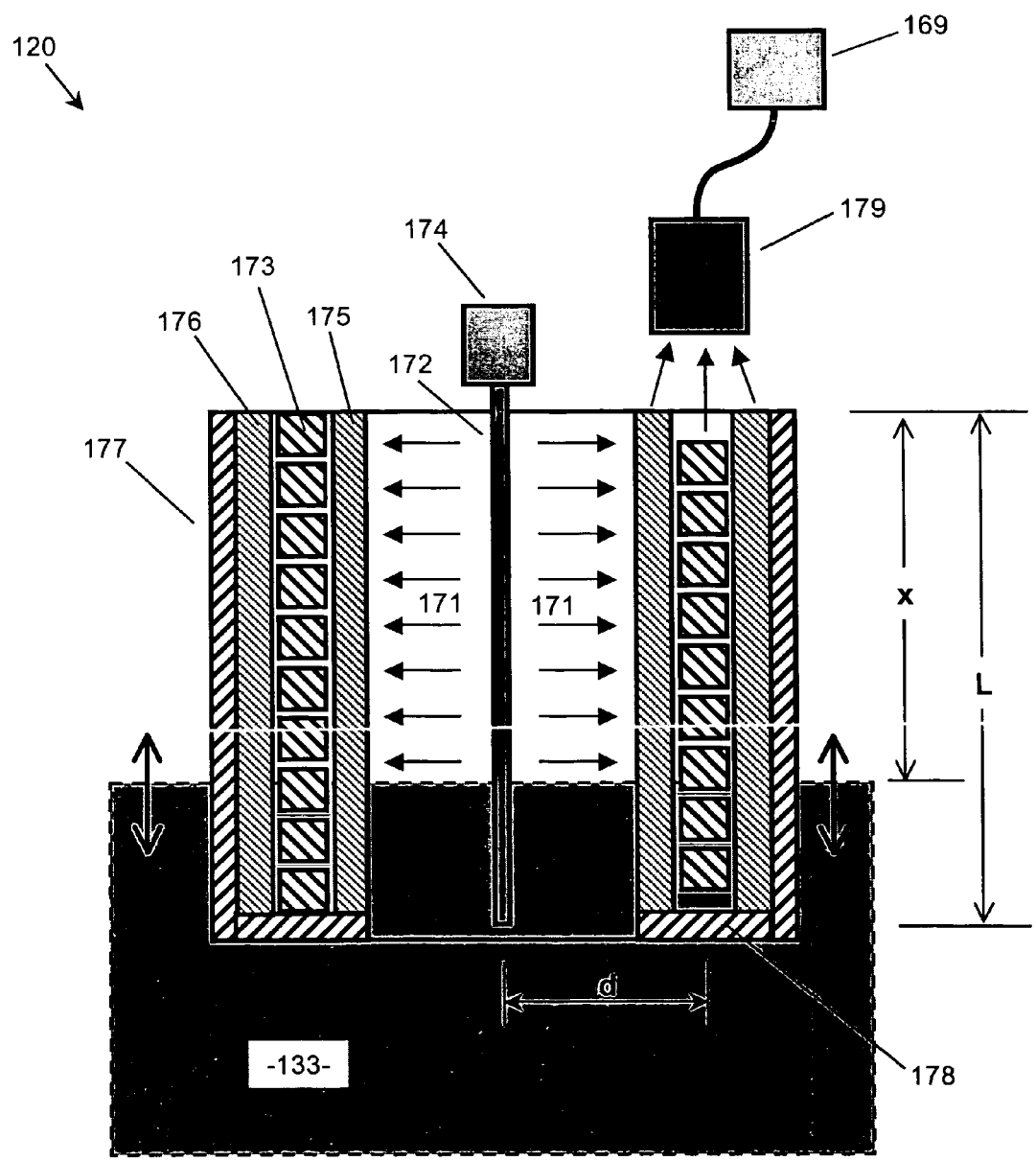
FIG. 10 shows a schematic cross-section view of another example of an optical position sensor.

FIG. 10 shows a schematic cross-section view of another example of an optical position sensor. This embodiment is similar to that shown in FIGS. 9A and 9B, except that the coiled detector fiber 173 has a square cross-section shape, which allows it to be packed tightly in-between individual turns of coils/wraps. The coiled detector fiber 173 is sandwiched in-between a pair of concentric, transparent, thin-walled tubes 175 (on the inside) and 176 (on the outside). These tubes serve to confine and support coiled detector fiber 173. Additionally, if the refractive index of the confining tubes 175, 176 is lower than that of the core of light source fiber 172, then any light that would had otherwise been emitted radially outwards (e.g., unguided secondary fluorescence) from detector fiber 173, then the confining tubes 175, 176 will trap and guide this escaped light in a direction parallel to the central axis of the tubes. Subsequently, light emitted at the upper end of the confining tubes 175, 176 can be collected and added to the light that is emitted by the upper end of detector fiber 173, where it is subsequently detected by detector 179 and analyzed by processor 169. Consequently, the overall efficiency of the sensor 120 is enhanced by capturing unguided light (e.g., secondary fluorescence) emitted from detector fiber 173. An optional structural tube 177 (e.g., aluminum) can be added to support confining tubes 175, 176 and detector fiber 173. The lower end and/or the inner surface of structural tube 177 can be mirrored to reflect light backwards. Light source fiber 172 and/or coiled detector fiber 173 may comprise fluorescing dopants, or side-emitting features, or they may use combinations of dopants and side-emitting features. Both fibers may have a mirrored end to reflect light backwards up the fiber. A square, plastic fiber is commercially available, which could be used for detector fiber 173; although a square cross-section is not required.

Figure 11A:
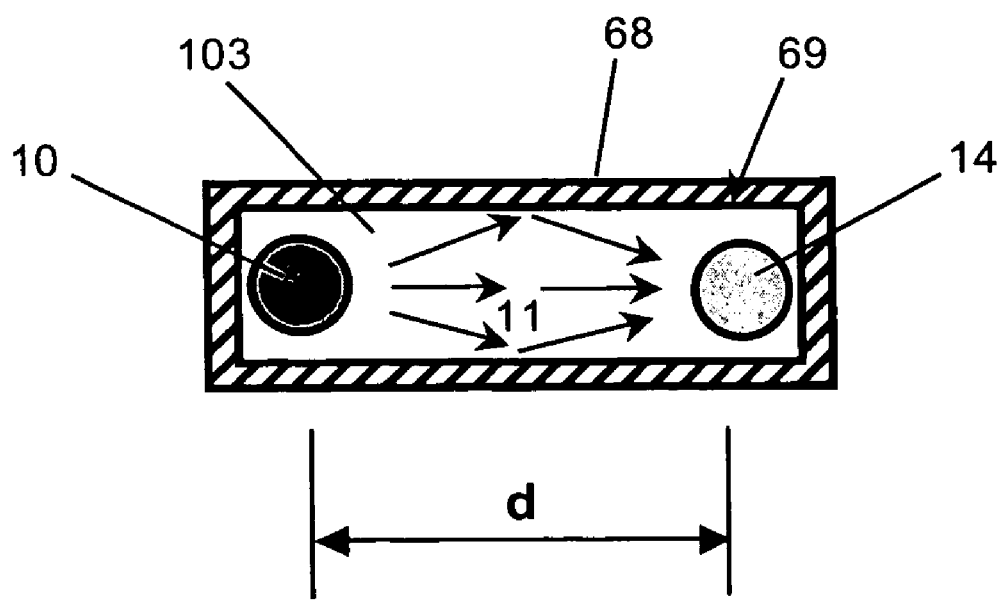
FIG. 11A shows a cross-section bird's eye view of another example of an optical position sensor.

FIG. 11A shows a cross-section bird's eye view of another example of an optical position sensor, according to the present invention. Primary fiber 10 and detector fiber 14 are disposed (inside) at opposite ends of a rectangular housing 68, which has a reflective inner surface 69. Light 11 emitted from primary fiber 10 illuminates detector fiber 14 through a combination of direct illumination and indirect illumination via reflection(s) off of the reflective inner surface 69. Primary fiber 10 and/or detector fiber 14 may comprise fluorescing dopants, or side-emitting features, or they may use combinations of dopants and side-emitting features. The internal space 103 contained inside of housing 68 may be filled with an opaque or transparent fluid during operation.

Figure 11B:
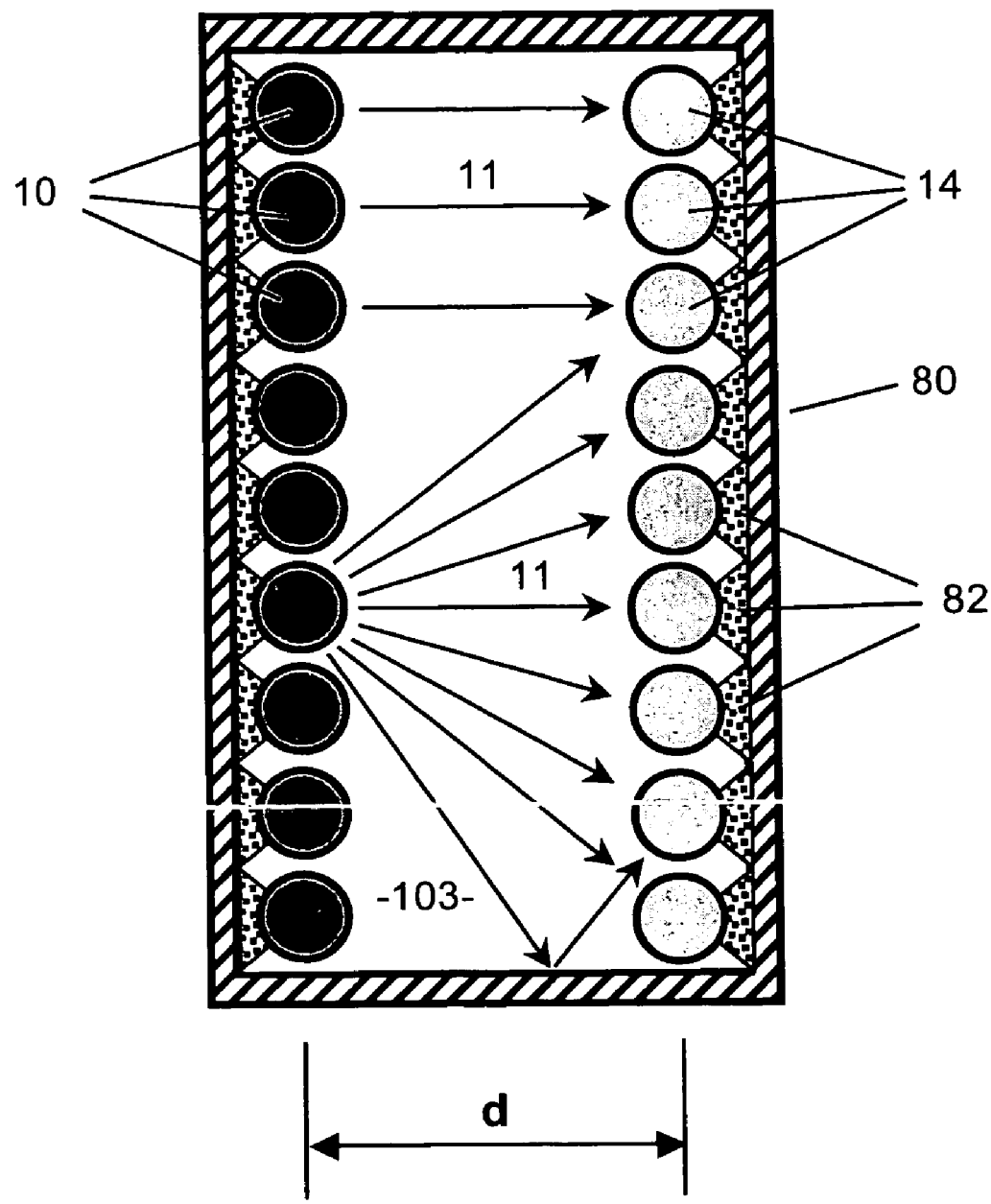
FIG. 11B shows a cross-section bird's eye view of another example of an optical position sensor.

FIG. 11B shows a cross-section bird's eye view of another example of an optical position sensor, according to the present invention. This example is similar to that shown in FIG. 11A, except that a plurality of source fibers 10 are disposed along one end or wall of rectangular housing 80, and a plurality of detector fibers 14 are disposed along the opposite facing end or wall of rectangular housing 82. Fibers 10 and 14 may be attached to housing 80 with an adhesive 82, such as an epoxy, or other suitable adhesive. The interior walls of housing 80 may be reflective, to increase the amount of light 11 collected by detector fibers 14.

Figure 12A:
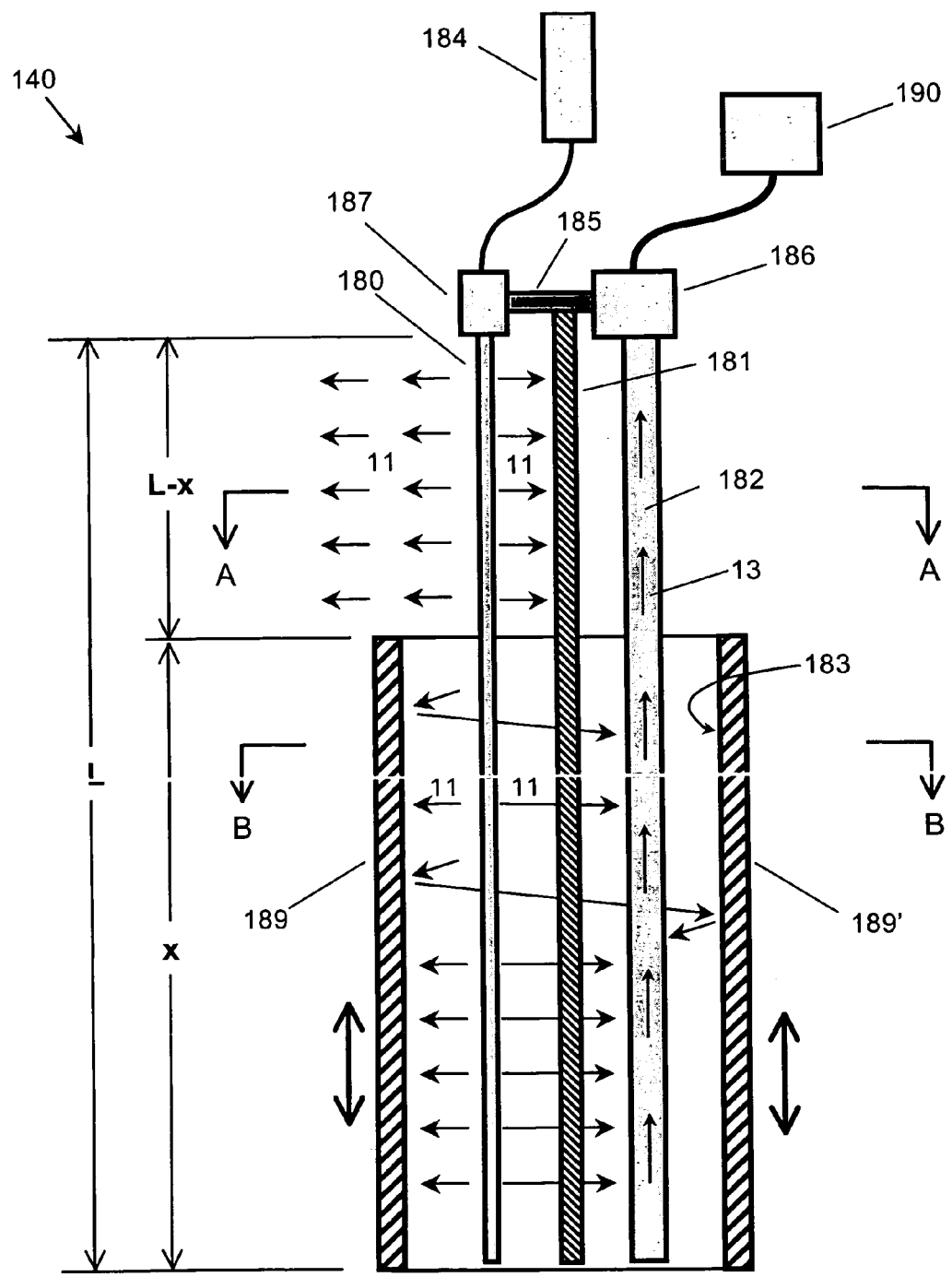
FIG. 12A shows a cross-sectional side view of another example of an optical position sensor.

FIG. 12A shows a cross-sectional side view of another example of an optical position sensor. Sensor 140 comprises: a linear light source 180 having a length=L; a detector waveguide 182 oriented substantially parallel to light source 180 and spaced apart from light source 180 by a substantially fixed distance, d, wherein d<<L; divider means 181 for preventing light 11 from directly illuminating waveguide detector 182; reflecting means 189 for reflecting light 11 emitted along length x of source fiber 180 towards detector waveguide 182; a coupler 187 for coupling light generated by supply 184 into source fiber 180; means for generating light 13 that is guided within detector waveguide 182 in response to waveguide 182 being illuminated by light 11 that is reflected by reflective means 189 along the length=x; light detector 186 optically coupled to an upper end of detector waveguide 182; and processor means 190, operably connected to light detector 186 for calculating the desired length measurement, x, by analyzing a signal outputted by light detector 186 in response to guided light 13 that is emitted from the upper end of detector waveguide 182. Light 11 emitted from the upper portion of light source 180 along length=L-x is lost and does not intercept detector fiber 182. Divider 181 prevents light 11 from directly shining on detector fiber 182. However, light 11 emitted from the lower portion of source fiber 180 along the length=x is reflected from inner surface 183 and indirectly illuminates detector fiber 182.

Reflective means 189 may comprise a tube 189 with a reflective inner surface 183. Tube 189 may have a circular, elliptical, rectangular or square cross-sectional shape. Alternatively, reflective means 189 may comprise two parallel plates 189, 189' having reflective inner surfaces. Divider 181 may be held in a fixed position relative to source 180 and waveguide detector 182, for example, by a rigid connecting member 185 that attaches to coupler 187 and detector 186. Those skilled in the art will appreciate that there are many different ways to hold divider 181 in a fixed position relative to source 180 and waveguide detector 182.

Figure 12B:
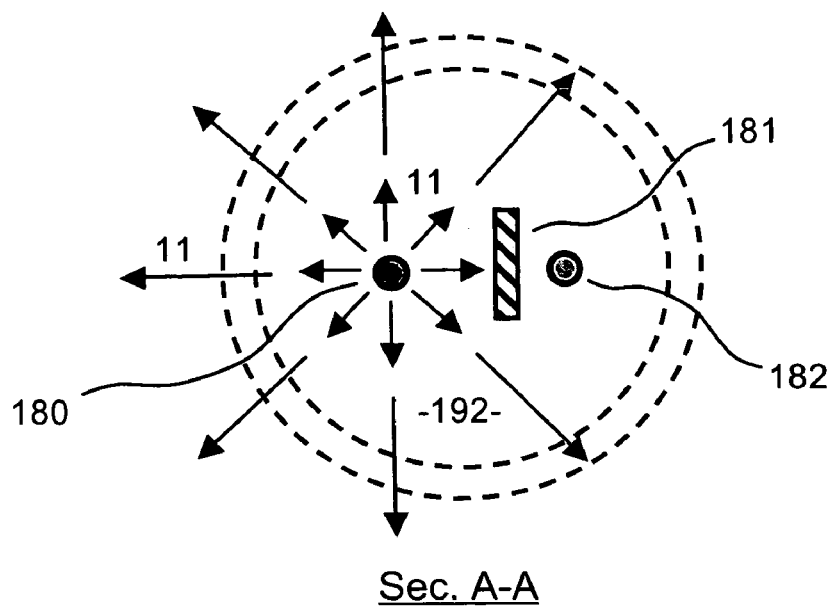
FIG. 12B shows a bird's eye cross-sectional view of the sensor of FIG. 12A taken at the section A—A.

FIG. 12B shows a bird's eye cross-sectional view of the sensor of FIG. 12A taken at the section A—A. Divider 181 prevents light 11 from directly shining on detector fiber 182. Divider 181 is made of an opaque material, and may have a rectangular, square, or circular shape.

Figure 12C:
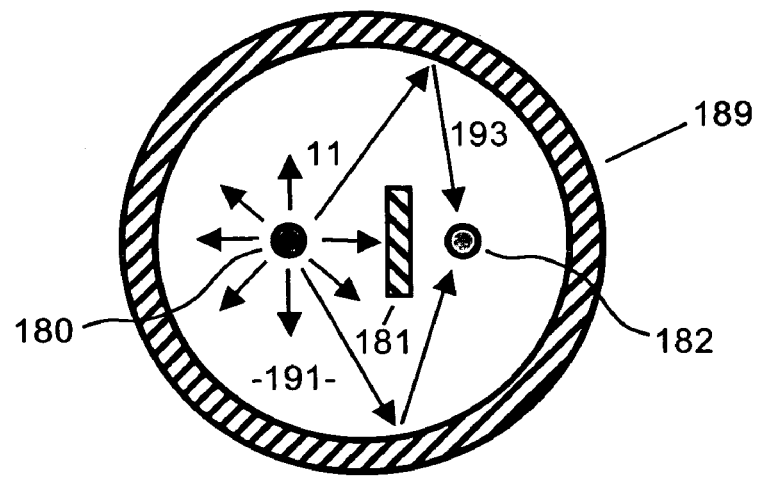
FIG. 12C shows a bird's eye cross-sectional view of the sensor of FIG. 12A taken at the section B—B.

FIG. 12C shows a bird's eye cross-sectional view of the sensor of FIG. 12A taken at the section B—B. Light 11 emitted from the lower portion of source fiber 180 along the length=x is reflected from inner surface 183 and indirectly illuminates detector fiber 182. Divider 181 prevents light 11 from directly shining on detector fiber 182.

Sensor 140 may be located in air or a vacuum, or a substantially transparent liquid or gas. Sliding supports (not shown) can be used to permit relative sliding motion along a single axis (X-direction) of the reflective tube 183 relative to the assembly comprising source fiber 180, divider 181, and detector fiber 182. In all other respects, the structure and operation of this embodiment is essentially the same as was described earlier.

Alternatively, sensor 140 of FIGS. 12A, 12B and 12C can be used to detect the position of an interface between two immiscible, opaque and transparent, fluids. When used this way, the length of reflective tube 189 extends along the entire length, L, of source fiber 180, and reflective tube 189 does not move with respect to the assembly comprising source fiber 180, divider 181, and detector fiber 182.

Next, I will present a couple of embodiments that use a single, "dual-purpose", optical fiber (or waveguide), instead of two parallel fibers spaced apart by a distance, d, as has been previously presented.

Figure 13:
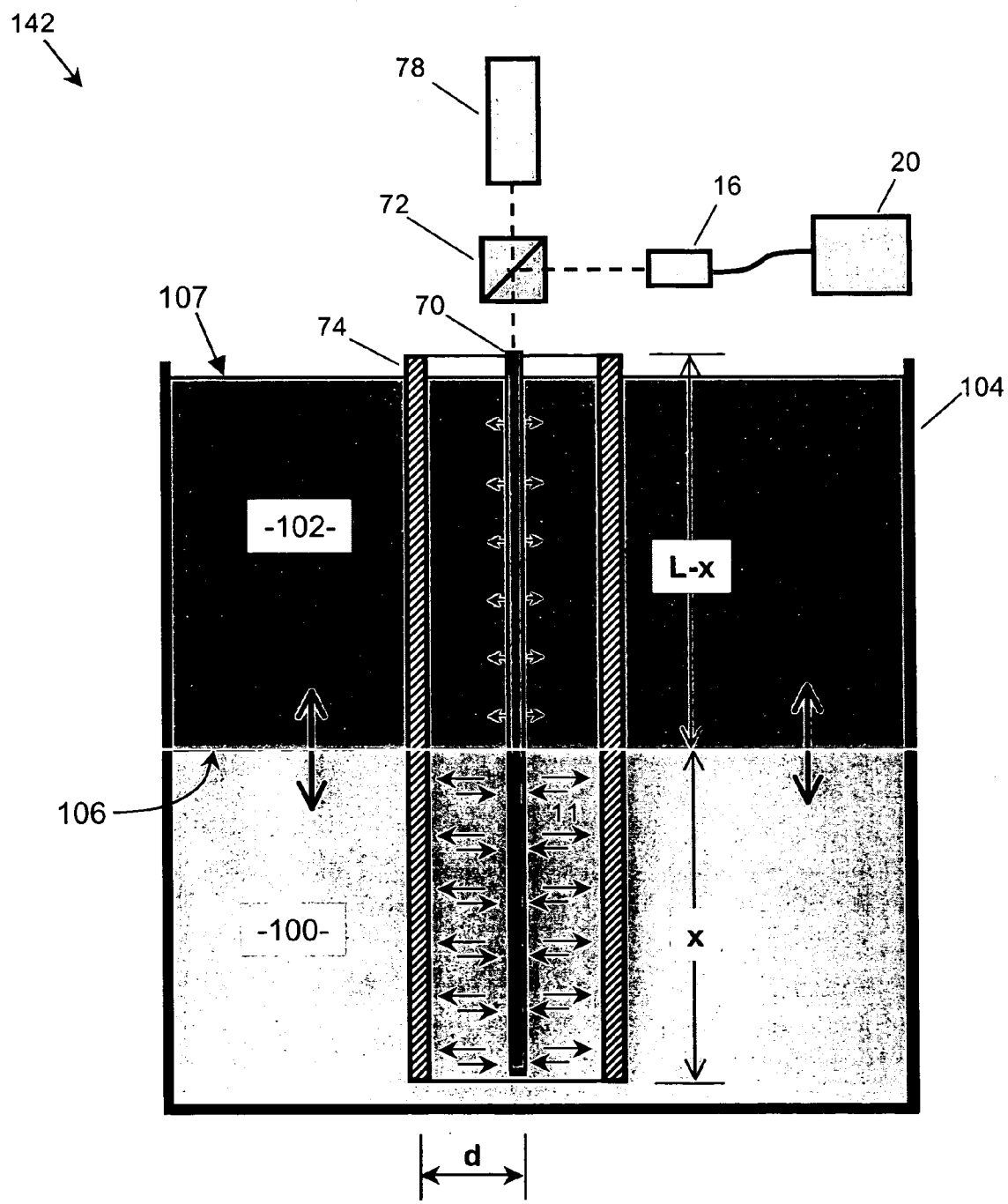
FIG. 13 shows a schematic side view of another example of an optical position sensor.

FIG. 13 shows a schematic side view of another example of an optical position sensor. Tank 104 contains a heavier, clear liquid 100 (e.g., water) on the bottom; and a lighter, opaque liquid 102 (e.g., crude oil) floating on top of the clear liquid 100. The boundary in-between the lower clear liquid 100 and the upper opaque liquid 102 is labeled as interface 106. The position of interface 106 is located at a vertical distance, x, from the bottom of tank 104. Light emission means 70 comprises a side-emitting optical fiber, which also acts as a side-receiving fiber, hence, the name "dual-purpose". Light from supply 78 (e.g., LED or laser) passes through beamsplitter 72 (or other type of fiber optic splitter) and enters the upper end of side-emitting, primary fiber 70. The light 11 emitted by fiber 70 in the upper part of tank 104 is blocked by opaque fluid 102. However, the light 11 emitted in the lower part of tank 104 travels through clear fluid 100, bounces off of the interior reflective surface of tube 74, and then travels back to fiber 70, where it is collected by the side-collecting features (which are the same as the side-emitting features) of primary fiber 70. Then, this collected light trapped and guided back up fiber 70 to beam-splitter 72, where some of this collected light 13 reflects off beamsplitter 72 toward light detector 16 for analysis by processor 20. In this way, fiber 70 has a dual function, i.e., to act as the light emission source, and to act as the light collection means. This is possible because of the dual properties of a side-emitting fiber. In some embodiments, the scattering features that cause side-emission/collection can be confined to being located only along the length=L of the fiber; meaning that the part of fiber 70 in-between beamsplitter 72 and the section, L, having side-emitting features, can be smooth and doesn't need side-emitting features. This design eliminates the need to use an optical coupling to connect a side-emitting fiber with a clear (non-emitting) fiber.

Alternatively, instead of being a side-emitting/receiving fiber, fiber 70 in FIG. 13 can be "co-doped" with both the primary and secondary fluorescent dopants that were discussed in the previous embodiments (e.g., FIGS. 1–12). A Co-doped fiber may comprise a single fiber that has two or more fluorescing dopants intimately mixed together. Alternatively, a co-doped fiber may have, for example, the primary dopant contained inside the cladding of the fiber, and the secondary dopant residing inside the core of the fiber. In FIG. 13, light source 78 pumps "dual-purpose" fiber 70 with excitation light, e.g. blue laser light, that causes the first dopant to emit primary fluorescent light (e.g., green fluorescence). Neglecting any effect due to attenuation along the length of fiber 70, primary fluorescent light 11 is emitted uniformly along the length, L, of fiber 70. Primary fluorescent light 11 emitted from the upper portion of fiber 70 having a length=L−x will be absorbed and blocked by opaque fluid 102 from reaching reflective tube 74; while the primary fluorescent light 11 emitted from the lower portion of fiber 70 having a length=x will pass substantially through clear liquid 100, then be reflected off of tube 74, and then travel back to fiber 70, where secondary fluorescence (e.g. red light) is excited in fiber 70 within the first portion having a length=x. Some of the secondary fluorescence is trapped and guided back up fiber 70 to beamsplitter 72, where it reflected and sent to detector 16 for detection and processing.

When "dual-purpose" fiber 70 is co-doped with both primary and secondary fluorescent dopants, a constant, offset or baseline signal will be generated by detector 16 because the pump light will excite primary fluorescence along the entire length, L, of fiber 70; which, in turns, excites secondary fluorescence along the fiber's entire length, some of which is trapped and guided. The existence of this baseline signal may be used to self-monitor the operation of sensor 142, since the strength of the baseline signal is independent of the unknown, variable length measurement, x.

Figure 14:
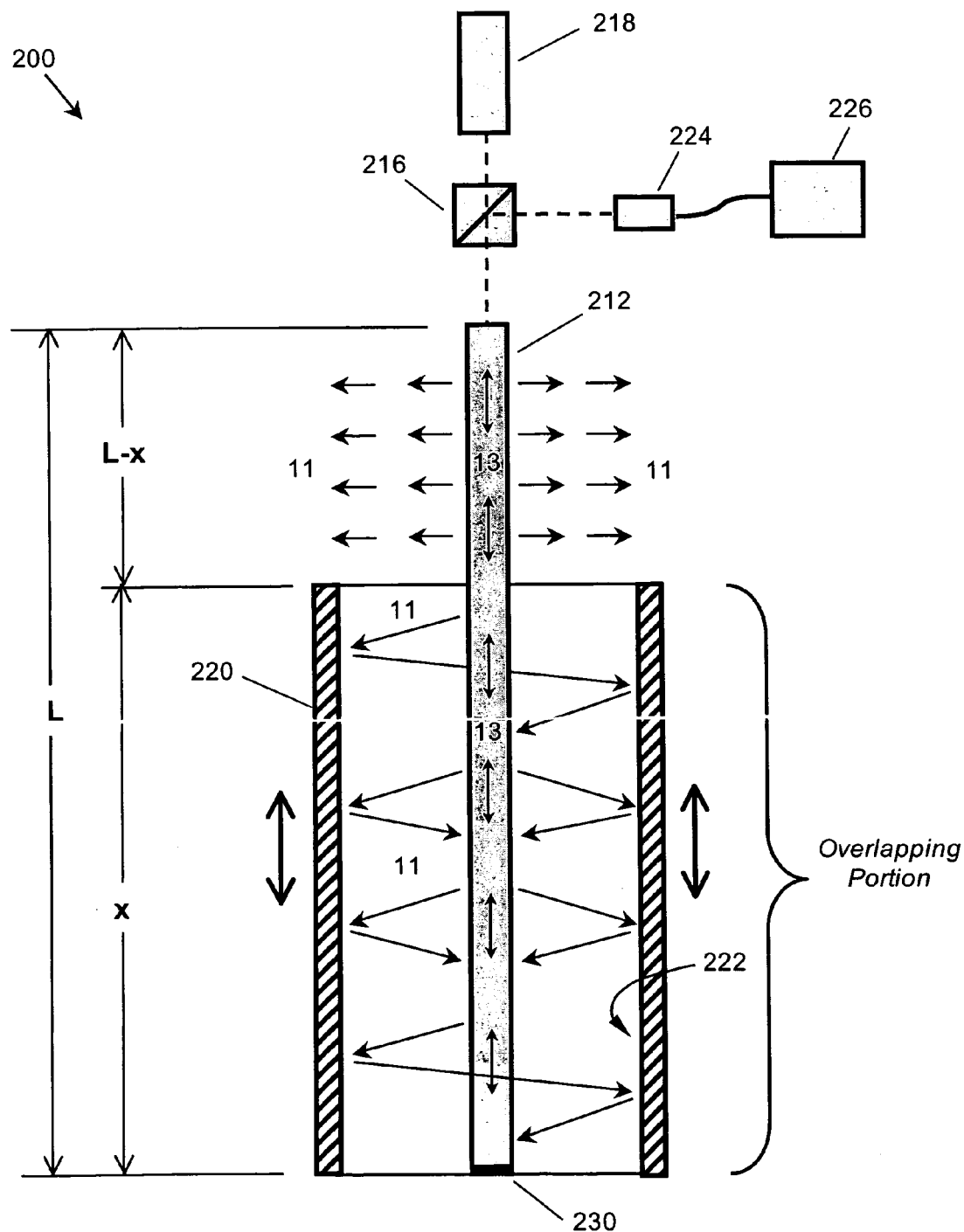
FIG. 14 shows a schematic side view of another example of an optical position sensor.

FIG. 14 shows a schematic side view of another example of an optical position sensor. Reflective structural tube 220 overlaps at least part of the dual-purpose fiber 212, by a length=x. Fiber 212 is a dual-purpose fiber, serving as both the light emission means, and as the light collection means, combined. Fiber 212 can be a side-emitting fiber, or, fiber 212 can be a "co-doped" fiber that operates according to the "dual-fluorescence" principle. Alternatively, fiber 212 can have both of these properties, i.e., side-emitting features and "co-doped". The structure and operation of sensor 200 in FIG. 14 is essentially the same as the two-fiber sensor 140 shown in FIGS. 12A–C, except that a single "dual-purpose" fiber 212 replaces the assembly in FIGS. 12A–C that comprises primary fiber 180, divider 181, and secondary fiber 182.

No embodiments of structures or methods of the present invention require that light emitted from the light emission source must be oriented to shine on a transparent liquid sensing surface defining an interface with a fluid to be detected; wherein the source light undergoes total internal reflection from the sensing surface, and then shines towards a detector waveguide, when a first fluid is present on the wetted side of the surface; and wherein the source light is refracted and passes through the sensing surface when a second fluid, having a higher refractive index than the first fluid, is present on the wetted side of the interface surface; and wherein the angle of orientation with which the source light impinges on the liquid sensing surface (as measured with respect to the surface normal of the sensing surface) lies in-between the two critical angles that define total internal reflection corresponding to each of the two fluids, respectively.

Specifically, no embodiments of an optical position sensor, according to the present invention, comprise: at least two optical fibers having at least a portion thereof embedded in a transparent substrate material of similar refractive index, one of said fibers being optically connected to a light source and being capable of emitting a particular wavelength or range of wavelengths of light along its length, the other fiber being optically connected to a light detector and being doped so as to fluoresce at the wavelength(s) emitted by said source fiber, the two optical fibers being oriented with respect to an interface between said substrate and the fluids to be measured so that light exiting the source fiber is coupled into the detector fiber when total internal reflection occurs at the substrate-fluid interface in the presence of a first fluid, and coupling does not occur in the presence of a second fluid of higher refractive index than the first fluid.

Additionally, no embodiments of methods for measuring a position or length using an optical position sensor, according to the present invention, comprise the following method steps: embedding at least a portion of each of two optical fibers in a transparent substrate material having a refractive index similar to that of the optical fibers; connecting a first of said optical fibers to a light source to cause said first optical fiber to emit a specified wavelength or range of wavelengths; producing in a second of said optical fibers a fluorescence in response to light of said specified wavelength from said first optical fibers; detecting the light producing by fluorescence in said second optical fiber; providing an interface between said substrate material and fluids to be detected; and orienting said fibers with respect to said interface so that light emitted by said first optical fiber is coupled into said second optical fiber when total internal reflection occurs at the substrate-fluid interface in the presence of a first fluid and coupling does not occur in the presence of a second fluid of higher refractive index than the first fluid.

Additionally, no embodiments of an optical position sensor, according to the present invention, comprise: at least two optical fibers; one of said fibers being coupled at one end to an optical source, and at the other end to a source lightguide which emits light in a radial direction; the other fiber being coupled at one end to an optical detector, and at the other end to a detector lightguide which accepts light in a radial direction; the source lightguide and detector lightguide being oriented such that light emitted by the source lightguide is incident on a transparent liquid sensing surface and undergoes total internal reflection in the presence of a first fluid, thus being coupled to the detector lightguide, and, in the presence of a second fluid of higher refractive index at the liquid sensing surface, the interface becomes primarily transmissive, offering relatively little reflective coupling to the detector lightguide, and where the source and detector lightguides are each similarly formed as a cylindrical optical waveguide with a plurality of notches formed therein along the length thereof.

Additionally, no embodiments of an optical position sensor, according to the present invention, comprise: an optically transparent liquid sensing surface defining an interface with a fluid to be detected; a source lightguide adjacent said surface; a first cylindrical optical fiber coupled at a first end to a source of light and at a second end to said source light guide; a detector lightguide adjacent said surface; a second cylindrical optical fiber coupled at a first end to said detector lightguide and at a second end to a light detector; said source lightguide and said detector light guide each incorporating plural notches formed along the length thereof whereby said source lightguide emits light in a radial direction and said detector lightguide accepts light in a radial direction, said source lightguide and detector lightguide being oriented with respect to each other and to said surface so that light emitted radially from said source lightguide is incident on said surface, undergoes total internal reflection in the presence of a first fluid having a first refractive index at said surface interface, and is coupled into said detector lightguide, and so that light emitted radially from said source lightguide and incident on said surface undergoes at least some transmission through said surface in the presence of a second fluid having a second refractive index which is higher than said first refractive index, whereby the amount of light received by said detector lightguide from said source lightguide is related to the relative levels of said first and second fluids at said interface.

The growth of algae or other biological film on the surface of optical fibers used in various embodiments of the present invention is undesirable because the transmission of light through the side of the fibers is reduced as the thickness of the algae coating increases. In this case, the fibers (including both the source and detector fibers) may be doped with chemicals that emit ultraviolet (UV) light, or by pumping the fibers directly with UV light, because it is known that UV light kills algae cells.

Alternatively, the primary and secondary fibers (in a two-fiber version of the sensor), or a single, dual-purpose fiber, may optionally be encases or potted in a clear plastic material, such as a clear acrylic or epoxy, which might be less susceptible to biofouling or chemical attack. Normal operation should not be affected.

The particular examples discussed above are cited to illustrate particular embodiments of the invention. Other applications and embodiments of the apparatus and method of the present invention will become evident to those skilled in the art.

It is to be understood that the invention is not limited in its application to the details of construction, materials used, and the arrangements of components set forth in the following description or illustrated in the drawings.

The scope of the invention is defined by the claims appended hereto.

What is claimed is:

1. An optical position sensor for measuring a length, x, along a one-dimensional curvilinear, coordinate system, X, comprising:
   light emission means, having a first portion with a length=x, and a second portion having a length=L−x, for emitting light along a length=L; wherein the axial distribution of light emitted by the light emission means is substantially constant along the X-axis;
   light collection means for collecting light emitted from the first portion of the light emission means;
   means for preventing light emitted from the second portion of the light emission means from being collected by the light collection means; and
   light detector means, optically coupled to an upper end of the light collection means, for detecting guided light emitted from the upper end of the light collection means, and for generating an output signal that is proportional to the intensity of detected light; and
   processor means operably connected to the light detector means, for calculating the desired length, x, by analyzing the output signal generated by the light detection means;
   wherein the output signal generated by the light detection means increases monotonically as the length, x, of the first portion of the light emission means increases;
   wherein the optical position sensor does not comprise means for internally reflecting light, emitted from the first portion of the light emission means, off of a transparent liquid sensing surface, in a direction towards the light collection means, when the transparent liquid sensing surface is wetted on its opposite side by a first liquid having a first refractive index; and
   wherein the optical position sensor does not comprise means for refracting and transmitting light, emitted from the second portion of the light emission means, through the transparent liquid sensing surface, when the transparent liquid sensing surface is wetted on its opposite side by a second liquid having a second refractive index that is greater than the first refractive index of the first liquid.

2. The sensor of claim 1,
   wherein the light emission means comprises a primary fiber
   wherein the light collection means comprises a secondary fiber that is spaced apart from the primary fiber by a substantially constant distance, d, wherein d<<L; and
   wherein the secondary fiber is oriented substantially parallel to the primary fiber.

3. The sensor of claim 2, further comprising a movable opaque divider, disposed in-between the primary and secondary fibers; said divider being selected from the group consisting of a sheet, baffle, shield, mask, separator, blade, shade, shutter, partition, tube, and cylinder.

4. The sensor of claim 2, wherein the secondary fiber overlaps the first portion of the primary fiber by a length=x, where $x \leq L$; and wherein the origin of the X-axis coordinate system is located at an upper end of the primary fiber.

5. The sensor of claim 2,
   wherein the primary fiber comprises one or more features selected from the group consisting of (1) a first dopant that emits primary fluorescent light at a first peak wavelength when pumped by excitation light, and (2) side-emitting features; and
   wherein the secondary fiber comprises one or more features selected from the group consisting of (1) a second dopant that emits secondary fluorescent light at a second peak wavelength, when excited by primary fluorescent light emitted by the primary fiber, and (2) side-emitting features.

6. The sensor of claim 5,
   wherein the primary fiber is located at the central axis of a structural tube;
   wherein the light collection means comprises a plurality of secondary fibers disposed uniformly around the inner perimeter of the structural tube, oriented in a direction parallel to the tube's central axis; and wherein the open space inside of the structural tube comprises a clear fluid, an opaque fluid, or both.

7. The sensor of claim 5,
wherein the primary fiber is located at one focus of a hollow, elliptically-shaped structural tube that has a reflective inner surface;
wherein the secondary fiber is located at the other focus of said elliptical tube, with both fibers being oriented in a direction parallel to the tube's central axis; and
wherein the open space inside of the structural tube comprises a clear fluid, an opaque fluid, or both.

8. The sensor of claim 5,
wherein the primary fiber is located at the central axis of a round structural tube;
wherein the secondary optical fiber is wound in the shape of a helical coil that is disposed inside of, and is concentric with, the round structural tube; and
wherein the open space inside of the structural tube comprises a clear fluid, an opaque fluid, or both.

9. The sensor of claim 8, further comprising:
an outer optical waveguide in the shape of a hollow cylinder; and
an inner optical waveguide in the shape of a hollow cylinder;
wherein the outer cylindrical waveguide is concentric with the round structural tube, and is located in-between the helically-coiled secondary fiber and the inner perimeter of the tube;
wherein the inner cylindrical waveguide is concentric with the round structural tube, and is located inside of the helically-coiled secondary fiber; and
wherein the open space inside of the structural tube comprises a clear fluid, an opaque fluid, or both.

10. The sensor of claim 5,
wherein the primary fiber and the secondary fiber are disposed inside of a rectangular-shaped structural tube that has a reflective inner surface;
wherein the primary fiber is located along one side of rectangular tube; and the secondary fiber is located along the opposite side of the rectangular tube;
wherein the fibers are oriented in a direction parallel to the tube's central axis; and
wherein the open space inside of the structural tube comprises a clear fluid, an opaque fluid, or both.

11. The sensor of claim 2,
wherein the primary fiber comprises side-emitting features, disposed on only one side of the primary fiber, that restrict light emitted in the radial direction to be within a narrow angular spread, ranging from about 5 to 45 degrees; and
wherein the secondary fiber comprises side-emitting features, disposed on only one side of the secondary fiber, that restrict light collected in the radial direction to be within a narrow angular spread, ranging from about 5 to 45 degrees.

12. The sensor of claim 1,
wherein the light emission means and the light collection means are combined into a single, dual-purpose co-doped fiber that is co-doped with two dopants: a first dopant that emits primary fluorescent light at a first peak wavelength, and a second dopant that emits secondary fluorescent light at a second peak wavelength when exited by the primary fluorescent light;
further comprising a laser or LED source that passes pump light through a beamsplitter before being optically coupled to an upper end of the co-doped fiber; and
wherein light emitted from the upper end of the co-doped fiber reflects off the beamsplitter in a direction towards the light detector means.

13. The sensor of claim 12,
wherein the co-doped fiber is surrounded by, and is located at the central axis of, a hollow, structural tube having a reflective inner surface;
wherein the co-doped fiber has a total length=L, a first portion with a length=x, and a second portion having a length=L−x; and wherein the first portion of the co-doped fiber is the same as the first portion of the light emission means, and the second portion of the co-doped fiber is the same as the second portion of the light emission means; and
wherein primary fluorescent light, when excited by the pump light, is emitted by the first portion of the co-doped fiber, then reflects off of the reflective inner surface of the tube, and then travels back towards the first portion of the co-doped fiber, whereupon the reflected primary fluorescent light is absorbed and then excites secondary fluorescence in the co-doped fiber; some of which is guided inside of the co-doped fiber back towards the beamsplitter, which directs the secondary fluorescent light to the light detector means.

14. The sensor of claim 13, wherein the reflective inner surface of the structural tube extends along the entire length, L, of the co-doped fiber; and wherein the open space inside of the structural tube comprises a clear fluid, an opaque fluid, or both.

15. The sensor of claim 13, wherein the reflective structural tube overlaps at least part of the co-doped fiber by a length=x.

16. The sensor of claim 1,
wherein the light emission means and the light collection means are combined into a single, dual-purpose side-emitting fiber with side-emitting features;
further comprising a laser or LED source that passes pump light through a beamsplitter before being optically coupled to an upper end of the side-emitting fiber; and
wherein light emitted from the upper end of the side-emitting fiber reflects off the beamsplitter in a direction towards the light detector means.

17. The sensor of claim 16,
wherein the side-emitting fiber is surrounded by, and is located at the central axis of, a hollow, structural tube having a reflective inner surface;
wherein the side-emitting fiber has a total length=L, a first portion with a length=x, and a second portion having a length=L−x; and wherein the first portion of the side-emitting fiber is the same as the first portion of the light emission means, and the second portion of the side-emitting fiber is the same as the second portion of the light emission means; and
wherein light emitted by the first portion of the side-emitting fiber reflects off of the reflective inner surface of the tube, and then travels back towards the first portion of the side-emitting fiber, whereupon some of the reflected light is collected by the side-emitting fiber, and then is guided inside of the side-emitting fiber back towards the beamsplitter, which directs the collected light to the light detection means.

18. The sensor of claim 16, wherein the reflective inner surface of the structural tube extends along the entire length, L, of the side-emitting fiber; and wherein the open space inside of the structural tube comprises a clear fluid, an opaque fluid, or both.

19. The sensor of claim 16, wherein the reflective structural tube overlaps at least part of the side-emitting fiber by a length=x.

20. A method of measuring a length, x, along a one-dimensional curvilinear, coordinate system, X, comprising:
   a) emitting light from a primary fiber having a length=L, a first portion having a length=x, and a second portion having a length=L−x;
   b) collecting light emitted from the first portion of the primary fiber with a secondary fiber oriented substantially parallel to the primary fiber, and spaced apart from the primary fiber by a substantially constant distance, d, wherein d<<L;
   c) trapping and guiding some of the collected light inside of the secondary fiber;
   d) preventing light, emitted from the second portion of the primary fiber, from being collected by the secondary fiber;
   e) detecting, with a light detector that is optically coupled to an upper end of the secondary fiber, guided light that is emitted from the upper end of the secondary fiber; and
   f) calculating the desired length measurement, x, by analyzing an output signal, generated by the light detector, that increases monotonically as the length, x, of the first portion of the primary fiber increases;
   wherein the method does not comprise internally reflecting light, emitted from the first portion, off of a first side of a transparent liquid sensing surface, in a direction towards the light detector, when the transparent liquid sensing surface is wetted on its opposite side by a first liquid having a first refractive index; and
   wherein the method does not comprise refracting and transmitting light, emitted from the second portion, through the transparent liquid sensing surface, when a second fluid, having a second refractive index that is greater than the first refractive index, is present on the wetted side of the transparent liquid sensing surface.

21. The method of claim 20, wherein the primary fiber comprises a first dopant that emits primary fluorescent light at a first peak wavelength, and the secondary fiber comprises a second dopant that emits secondary fluorescent light at a second peak wavelength when excited by primary fluorescent light from the primary fiber; and wherein:
   step e) comprises exciting primary fluorescent light to be emitted along the entire length, L, of the primary fiber;
   step f) comprises collecting primary fluorescent light emitted from the first portion; and then exciting, with the collected primary fluorescent light, the second dopant to emit secondary fluorescent light at the second peak wavelength, some of which is trapped and guided within the secondary fiber;
   step h) comprises preventing primary fluorescent light, emitted from the second portion, from being collected by the secondary fiber; and
   step i) comprises detecting the intensity of guided secondary fluorescent light emitted from the end of the secondary fiber.

22. The method of claim 20, wherein the step of preventing primary fluorescent light emitted from the second portion from being collected by the secondary fiber light comprises blocking and preventing light emitted from the second portion of the primary fiber from illuminating the secondary fiber by using an opaque divider disposed in-between the primary and secondary fibers.

23. The method of claim 20, further comprising:
   inserting and supporting the primary and secondary fibers vertically in a tank containing two immiscible fluids; a denser, clear fluid resting on the bottom of the tank, and a lighter, opaque fluid resting on top of the clear fluid;
   wherein the interface between the clear and opaque fluids is located at a height above the bottom of the tank=x;
   wherein each fiber has a bottom end at the bottom of the tank so that the origin of the one-dimensional coordinate system at x=0 is located at the bottom of the tank;
   wherein step e) comprises transmitting light emitted from the first portion, through the clear fluid, to the secondary fiber; and
   wherein step h) comprises using the opaque fluid to block and prevent light emitted from the second portion from illuminating the secondary fiber.

24. The method of claim 20, wherein:
   the primary fiber overlaps the secondary fiber by a length=x;
   the primary and secondary fibers are movable with respect to each other along the X-axis;
   step e) comprises transmitting light emitted from the first portion, across to the adjacent, overlapping portion of the secondary fiber, to the secondary fiber; and
   step h) comprises not illuminating the secondary fiber with light emitted from the second portion, because there is no overlap between the second portion of the primary fiber and the secondary fiber.

25. The method of claim 20, wherein;
   the primary and the secondary fibers each comprise side-emitting features;
   step e) comprises sending light into the primary fiber, and then using the side-emitting features to scatter this light radially outwards;
   step f) comprises collecting scattered light emitted from the first portion of the primary fiber by using the side-emitting features of the secondary fiber; and
   step h) comprises preventing scattered light emitted from the second portion of the primary fiber from being collected by the secondary fiber.

26. The method of claim 20, further comprising using Optical Time Domain Reflectometry (OTDR) to determine the length, x, by measuring the amount of time that it takes for a pulse of light to travel through the fibers from beginning to end.

27. The method of claim 26, further comprising using ODTR to determine the thickness of an emulsion layer disposed in-between a clear and an opaque fluid, by measuring changes in the amplitude of the pulse of light as it travels through the fibers from beginning to end.

28. An optical position sensor for measuring a length, x, along a one-dimensional curvilinear, coordinate system, X, comprising:
   light emission means, having a first portion with a length=x, and a second portion having a length=L−x, for emitting light along a length=L; wherein the axial distribution of light emitted by the light emission means is substantially constant along the X-axis;
   light collection means for collecting light emitted from the first portion of the light emission means;
   means for preventing light emitted from the second portion of the light emission means from being collected by the light collection means; and
   light detector means, optically coupled to an upper end of the light collection means, for detecting guided light emitted from the upper end of the light collection means, and for generating an output signal that is proportional to the intensity of detected light; and processor means operably connected to the light detector means, for calculating the desired length, x, by analyzing the output signal generated by the light detection means;

wherein the output signal generated by the light detection means increases monotonically as the length, x, of the first portion of the light emission means increases;

wherein the light emission means and the light collection means are combined into a single, dual-purpose, side-emitting fiber;

further comprising a laser or LED source that passes pump light through a beamsplitter before being optically coupled to an upper end of the side-emitting fiber; and wherein light emitted from the upper end of the side-emitting fiber reflects off the beamsplitter in a direction towards the light detector means;

wherein the side-emitting fiber is surrounded by, and is located at the central axis of, a hollow, structural tube having a reflective inner surface;

wherein light emitted by the first portion of the side-emitting fiber reflects off of the reflective inner surface of the tube, and then travels back towards the first portion of the side-emitting fiber, whereupon some of the reflected light is collected by the side-emitting fiber, and then is guided inside of the side-emitting fiber back towards the beamsplitter, which directs the collected light to the light detection means;

wherein the reflective inner surface of the structural tube extends along the entire length, L, of the side-emitting fiber; and wherein the open space inside of the structural tube comprises a clear fluid, an opaque fluid, or both;

wherein the optical position sensor does not comprise means for internally reflecting light, emitted from the first portion of the light emission means, off of a transparent liquid sensing surface, in a direction towards the light collection means, when the transparent liquid sensing surface is wetted on its opposite side by a first liquid having a first refractive index; and wherein the optical position sensor does not comprise means for refracting and transmitting light, emitted from the second portion of the light emission means, through the transparent liquid sensing surface, when the transparent liquid sensing surface is wetted on its opposite side by a second liquid having a second refractive index that is greater than the first refractive index of the first liquid.

* * * * *